United States Patent
Sakai et al.

(10) Patent No.: US 7,949,178 B2
(45) Date of Patent: *May 24, 2011

(54) PATTERN INSPECTION METHOD AND ITS APPARATUS

(75) Inventors: Kaoru Sakai, Yokohama (JP); Shunji Maeda, Yokohama (JP); Takafumi Okabe, Yokohama (JP)

(73) Assignee: Hitachi High-Technologies Corporation, Tokyo (JP)

(*) Notice: Subject to any disclaimer, the term of this patent is extended or adjusted under 35 U.S.C. 154(b) by 165 days.

This patent is subject to a terminal disclaimer.

(21) Appl. No.: 12/230,362

(22) Filed: Aug. 28, 2008

(65) Prior Publication Data

US 2009/0003682 A1    Jan. 1, 2009

Related U.S. Application Data

(63) Continuation of application No. 10/797,011, filed on Mar. 11, 2004, now Pat. No. 7,433,508.

(30) Foreign Application Priority Data

Mar. 12, 2003 (JP) ................................. 2003-065886

(51) Int. Cl.
    *G06K 9/00* (2006.01)
(52) U.S. Cl. ...................... 382/144; 382/145; 382/274
(58) Field of Classification Search .............. 382/144
    See application file for complete search history.

(56) References Cited

U.S. PATENT DOCUMENTS

| | | | |
|---|---|---|---|
| 5,051,585 A | 9/1991 | Koshishiba et al. | |
| 5,153,444 A * | 10/1992 | Maeda et al. | 250/559.05 |
| 5,440,648 A * | 8/1995 | Roberts et al. | 382/141 |
| 5,459,794 A * | 10/1995 | Ninomiya et al. | 382/145 |
| 5,649,022 A * | 7/1997 | Maeda et al. | 382/141 |
| 6,047,083 A * | 4/2000 | Mizuno | 382/141 |
| 6,087,673 A * | 7/2000 | Shishido et al. | 250/559.45 |
| 6,169,282 B1 * | 1/2001 | Maeda et al. | 250/310 |
| 6,347,150 B1 * | 2/2002 | Hiroi et al. | 382/149 |
| 6,587,581 B1 * | 7/2003 | Matsuyama et al. | 382/149 |
| 6,614,923 B1 * | 9/2003 | Shishido et al. | 382/149 |
| 6,831,998 B1 * | 12/2004 | Koshishiba et al. | 382/147 |
| 6,876,445 B2 * | 4/2005 | Shibuya et al. | 356/237.2 |
| 6,888,959 B2 * | 5/2005 | Hamamatsu et al. | 382/149 |
| 6,943,876 B2 * | 9/2005 | Yoshida et al. | 356/237.2 |

(Continued)

FOREIGN PATENT DOCUMENTS

JP    10-048152 A    2/1998

(Continued)

*Primary Examiner* — Sath V Perungavoor
(74) *Attorney, Agent, or Firm* — Antonelli, Terry, Stout & Kraus, LLP.

(57) ABSTRACT

In a pattern inspection apparatus for comparing images of corresponding areas of two patterns, which are formed so as to be identical, so as to judge that a non-coincident part of the images is a defect, the influence of unevenness in brightness of patterns caused by a difference of thickness or the like is reduced, whereby highly sensitive pattern inspection is realized. In addition, high-speed pattern inspection can be carried out without changing the image comparison algorithm. For this purpose, the pattern inspection apparatus operates to perform comparison processing of images in parallel in plural areas. Further, the pattern inspection apparatus operates to convert gradation of an image signal among compared images using different plural processing units such that, even in the case in which a difference of brightness occurs in an identical pattern among images, a defect can be detected correctly.

9 Claims, 16 Drawing Sheets

U.S. PATENT DOCUMENTS

| | | | |
|---|---|---|---|
| 6,947,587 B1 * | 9/2005 | Maeda et al. | 382/149 |
| 7,113,627 B1 * | 9/2006 | Cahill et al. | 382/141 |
| 7,116,816 B2 * | 10/2006 | Tanaka et al. | 382/149 |
| 7,127,098 B2 * | 10/2006 | Shimoda et al. | 382/145 |
| 7,142,708 B2 * | 11/2006 | Sakai et al. | 382/149 |
| 7,263,216 B2 * | 8/2007 | Shishido et al. | 382/149 |
| 7,274,813 B2 * | 9/2007 | Maeda et al. | 382/141 |
| 7,388,979 B2 * | 6/2008 | Sakai et al. | 382/149 |
| 7,417,723 B2 * | 8/2008 | Hamamatsu et al. | 356/237.2 |
| 7,425,704 B2 * | 9/2008 | Miyai et al. | 250/310 |
| 7,433,508 B2 * | 10/2008 | Sakai et al. | 382/144 |
| 7,489,834 B2 * | 2/2009 | Kloth | 382/302 |
| 7,512,259 B2 * | 3/2009 | Maeda et al. | 382/144 |
| 7,620,232 B2 * | 11/2009 | Sakai et al. | 382/141 |
| 7,664,608 B2 * | 2/2010 | Urano et al. | 702/40 |
| 2002/0181756 A1 * | 12/2002 | Shibuya et al. | 382/145 |
| 2003/0021462 A1 | 1/2003 | Sakai et al. | |
| 2003/0053676 A1 * | 3/2003 | Shimoda et al. | 382/145 |
| 2003/0081201 A1 | 5/2003 | Shibata et al. | |
| 2003/0107736 A1 * | 6/2003 | Fujimoto | 356/394 |
| 2003/0118217 A1 | 6/2003 | Kondo et al. | |
| 2004/0240723 A1 * | 12/2004 | Sakai et al. | 382/141 |
| 2006/0159330 A1 * | 7/2006 | Sakai et al. | 382/141 |
| 2007/0036422 A1 * | 2/2007 | Sakai et al. | 382/149 |
| 2009/0226076 A1 * | 9/2009 | Sakai et al. | 382/149 |

FOREIGN PATENT DOCUMENTS

| | | | |
|---|---|---|---|
| JP | 10-110383 | * | 4/1998 |
| JP | 10-264275 | * | 9/1998 |

* cited by examiner

FIG.4
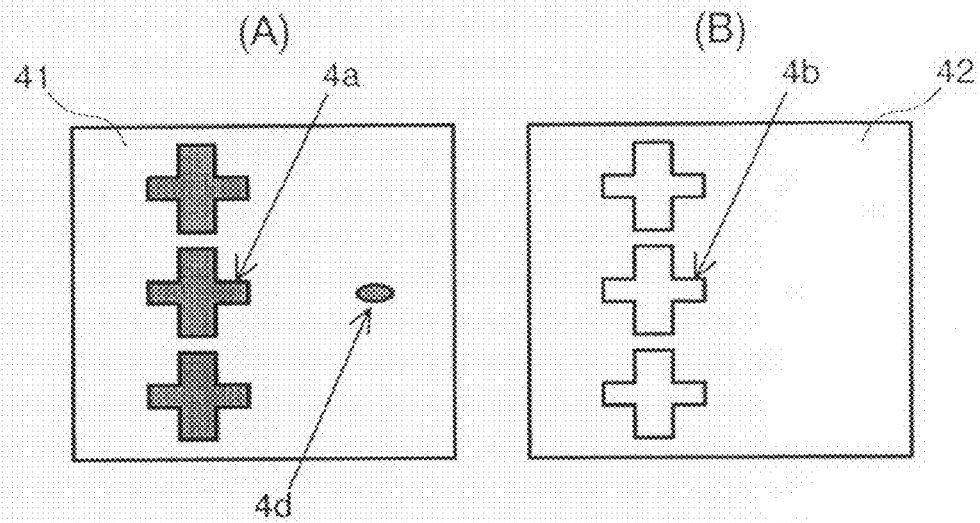
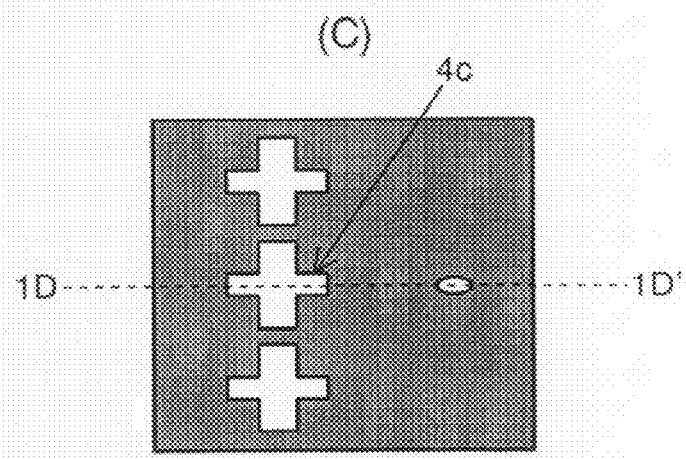
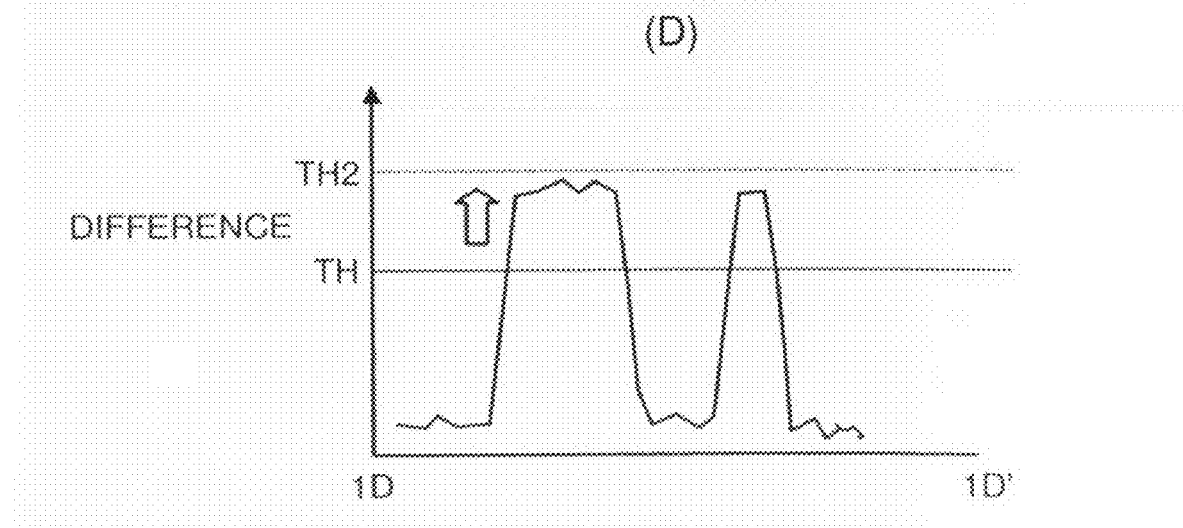

70 CHIP
72 PERIPHERAL CIRCUIT SECTION
71 MEMORY MAT SECTION

FIG.10
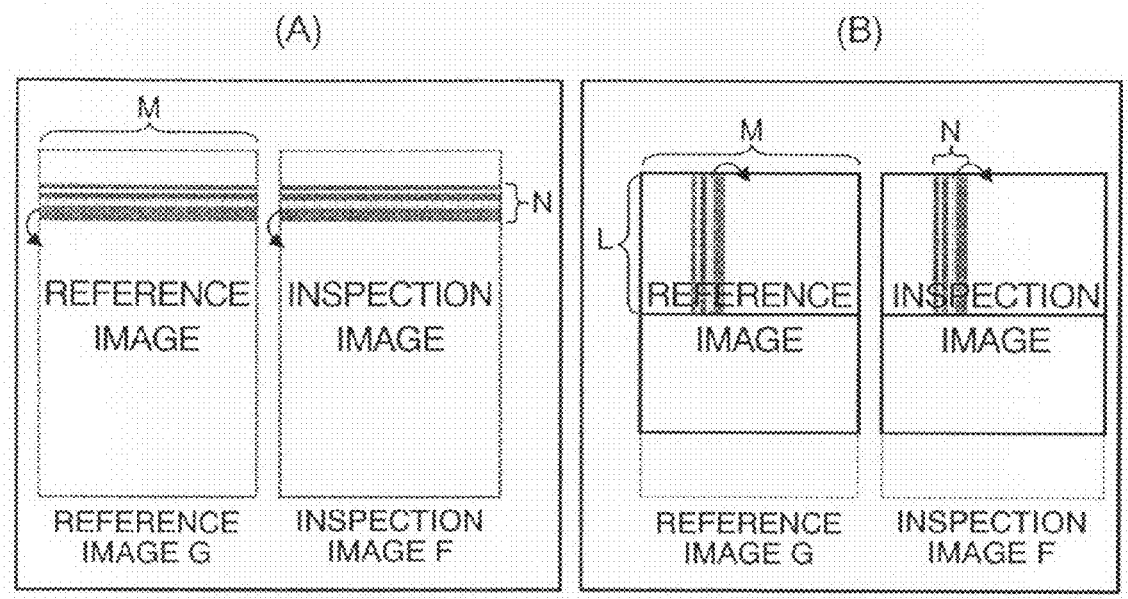
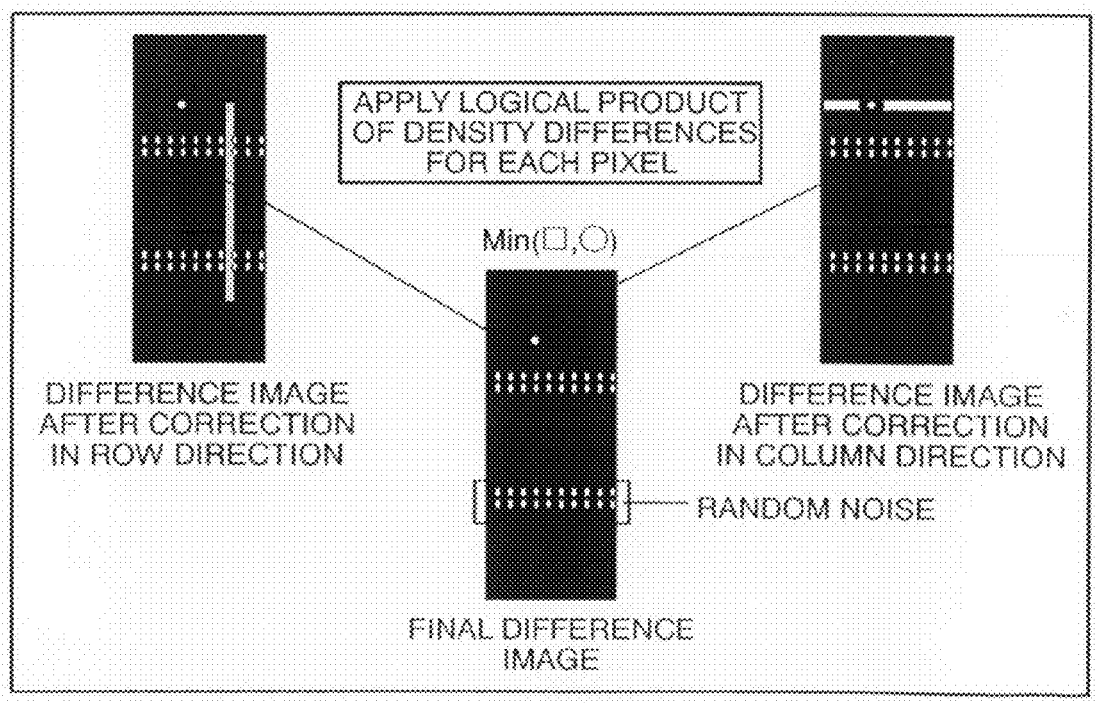

FIG.11
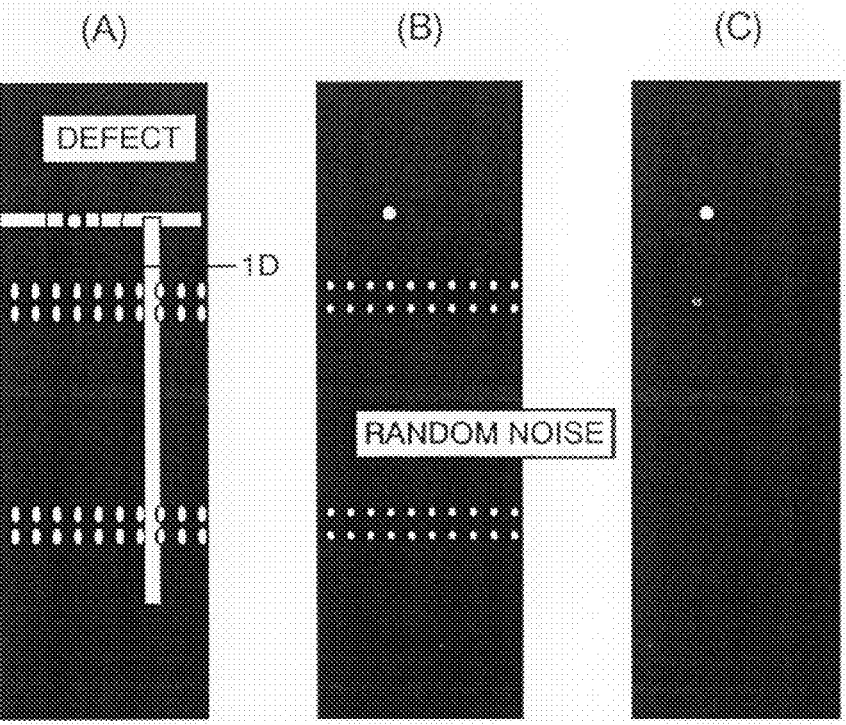
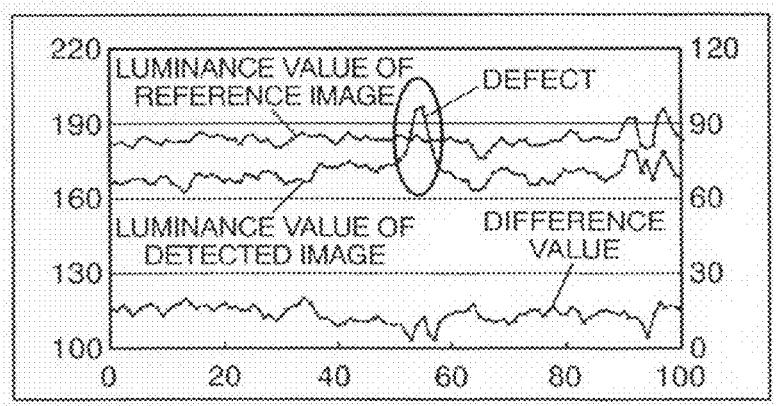
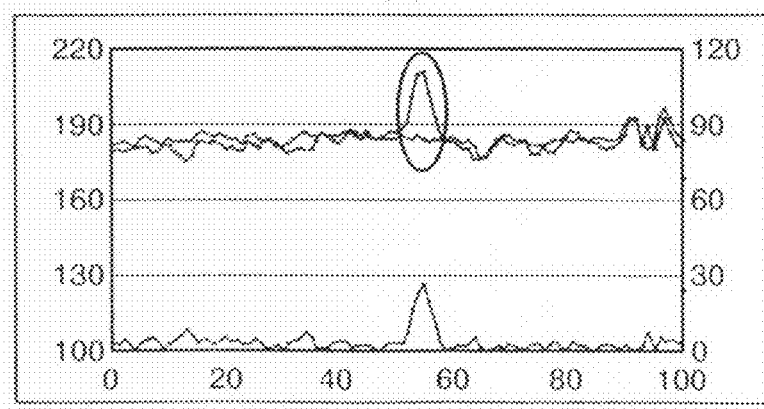

FIG.16
(A)
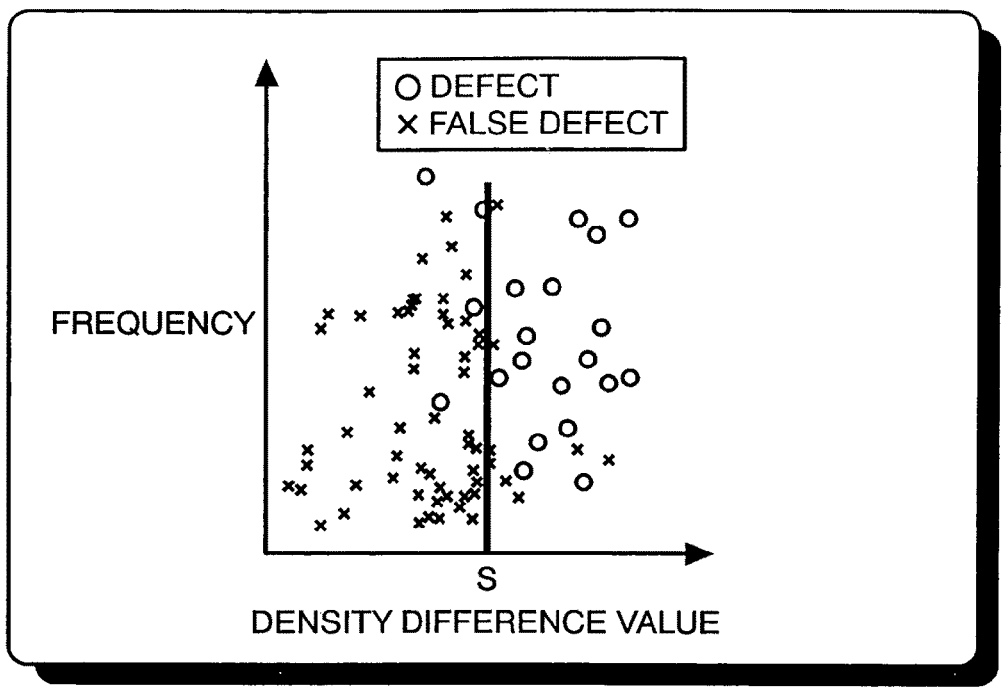
(B)
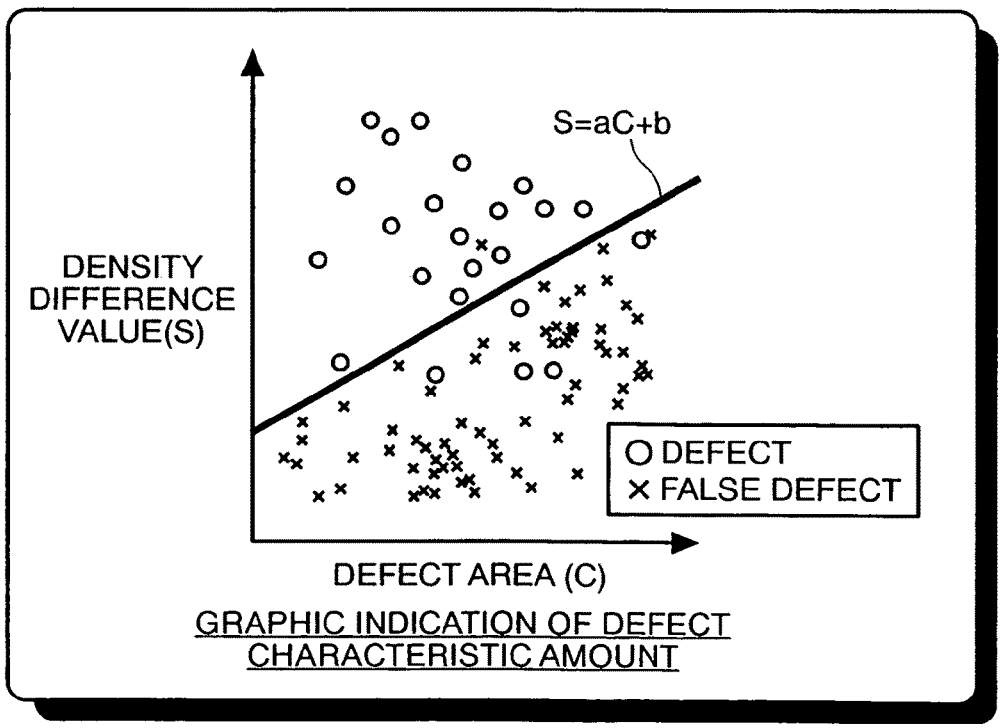
GRAPHIC INDICATION OF DEFECT
CHARACTERISTIC AMOUNT FIG.18
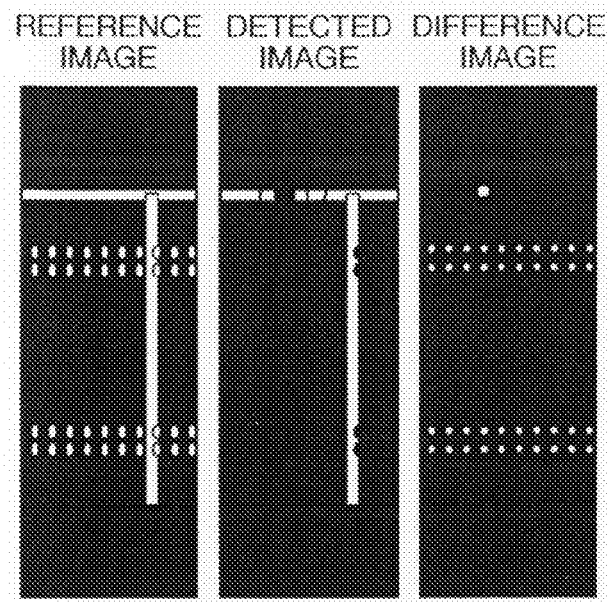
(A) REFERENCE IMAGE, DETECTED IMAGE, DIFFERENCE IMAGE
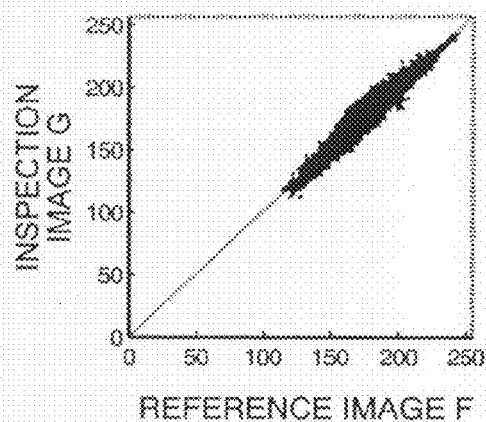
(B)
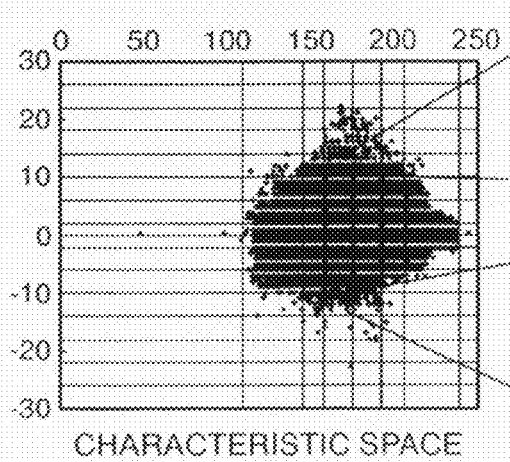
CHARACTERISTIC SPACE (C)
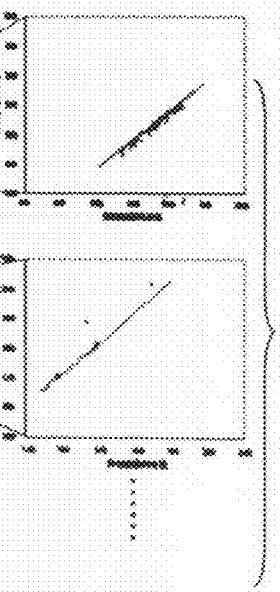
(D)

PATTERN INSPECTION METHOD AND ITS APPARATUS

CROSS REFERENCE TO RELATED APPLICATION

This application is a Continuation of U.S. application Ser. No. 10/797,011, filed Mar. 11, 2004, which claims priority from Japanese Patent Application No. 2003-065886, filed on Mar. 12, 2003 now U.S. Pat. No. 7,433,508, the contents of which are incorporated herein by reference.

BACKGROUND OF THE INVENTION

The present invention relates to an inspection method and apparatus for comparing an image of an object, which is obtained by using light, laser beams, or the like, and a reference image to detect a fine pattern defect, a foreign body, or the like from a difference between the images. In particular, the present invention relates to a pattern inspection apparatus that is designed preferably for performing visual inspection of a semiconductor wafer, a TFT, a photomask, and the like, and a method therefor.

As an example of a conventional technique for comparing an inspection object image and a reference image to detect a defect, reference is made to a method described in JP-A-05-264467. This method involves sequentially sensing images of an inspection object specimen using a line sensor, in which repetitive patterns are arranged regularly, comparing the sensed images with images delayed by a time for establishing a repetitive pattern pitch, and detecting a non-coincident part of the images as a pattern defect.

Such a conventional inspection method will be described in conjunction with the visual inspection of a semiconductor wafer, as an example. In a semiconductor wafer which serves as an object of inspection, as shown in FIG. 6, a large number of chips having an identical pattern are arranged regularly. As shown in FIG. 7, each chip can be roughly divided into a memory mat section 71 and a peripheral circuit section 72. The memory mat section 71 consists of a set of small repetitive patterns (cells), and the peripheral circuit section 72 basically consists of a set of random patterns. In general, in the memory mat section 71, the pattern density is high, and an image thereof obtained by a bright-field illumination optical system tends to be dark. On the other hand, in the peripheral circuit section 72, the pattern density is low, and an image thereof tends to be bright.

In the conventional visual inspection, images in the same positions of two chips adjacent to each other, for example, an area 61, an area 62, and the like, as seen in FIG. 6, are compared, and a difference between the images is detected as a defect. In this case, since there may be a vibration of the stage which holds the object, inclination of the object, or the like, the positions of the two images do not always coincide with each other. Thus, the amount of positional deviation of the image sensed by the sensor and the image delayed by the repetitive pattern pitch is determined, the two images are aligned on the basis of the amount of positional deviation, and then a difference between the images is calculated. When the difference is larger than a specified threshold value, it is judged that there is a defect in the pattern; and, when the difference is smaller than the threshold value, it is judged that there is no defect in the pattern.

In the alignment of two images in the comparative inspection, it is a general practice to set the edge parts in the images as one piece of information for calculation of the amount of positional deviation and to calculate the amount of positional deviation such that deviation of the edge parts between the images is minimized. Actually, a method has been proposed using normalized cross correlation, as well as a method using a sum of residuals, and the like. However, in any of such methods, since the amount of calculation is enormous, in order to realize speedup of the inspection, various measures have been required, such as changing the positional deviation calculation section to hardware or increasing the number of arithmetic operation circuits, and change of the image processing algorithm, such as simplification of the calculation of the amount of positional deviation.

In addition, in a semiconductor wafer which serves as the object of inspection, a slight difference in thickness occurs in a pattern due to planarization by CMP or the like, and so there is a difference in the brightness locally in images among chips. For example, reference numeral 41 in FIG. 4A denotes an example of an inspection object image, and reference numeral 42 in FIG. 4B denotes an example of a reference image. As indicated by the pattern 4a in FIG. 4A and the pattern 4b in FIG. 4B, a difference in the brightness occurs in an identical pattern of the inspection object image and the reference image.

In addition, there is a defect 4d in the inspection object image 41 of FIG. 4A. A difference image in this case is as shown in FIG. 4C. The difference image is an image represented by a density difference according to a differential value in corresponding positions of an inspection object image and a reference image. A waveform of a differential value in position 1D-1D' is as shown in FIG. 4D. With respect to such an image, if a part where the differential value is equal to or more than a specific threshold value TN is regarded as a defect, as in the conventional system, a differential value 4c of the patterns 4a and 4b, which are different in brightness, is detected as a defect. However, this condition should not originally be detected as a defect. In other words, this is a false defect or a nuisance defect (hereinafter referred to as a false defect). Conventionally, as one method of avoiding the occurrence of a false defect, such as indicated by the differential value 4c of FIG. 4C, the threshold value TN is increased (from TH to TH2 in FIG. 4D). However, this leads to a decrease in the sensitivity, and the defect 4d with a differential value of the same or lower level cannot be detected.

In addition, a difference in the brightness due to a difference in the thickness may occur only among specific chips within a wafer such as shown in FIG. 6, or it may occur only in a specific pattern within a chip. However, if the threshold value TH is adjusted to these local areas, the overall inspection sensitivity will be extremely decreased.

SUMMARY OF THE INVENTION

The present invention is directed to a pattern inspection apparatus for comparing images of corresponding areas of two patterns, which are formed so as to be identical, to judge that a non-coincident part of the images is a defect, and serves to reduce the influence of unevenness in brightness of patterns caused by a difference in the thickness or the like, so as to realize a highly sensitive pattern inspection. In addition, the present invention realizes high-speed pattern inspection without the need for changing the image comparison algorithm. Consequently, the problems of the conventional inspection technique can be solved.

In other words, in accordance with the present invention, a pattern inspection apparatus for comparing images of corresponding areas of two patterns, which are formed so as to be identical, so as to judge that a non-coincident part of the images is a defect, includes means for performing processing for detecting an image with an image sensor, processing for comparing images, and processing for judging a defect at different times. As a specific example of such means, the pattern inspection apparatus includes means for performing processing for comparing images in parallel in plural areas. Therefore, the pattern inspection apparatus includes plural units for performing processing for comparing images and a number of memories equal to or less than the number of units. In addition, the pattern inspection apparatus includes means for writing data in a memory of the image sensor and reading out data from the memory at different times.

Further, the pattern inspection apparatus includes means for converting gradation of an image signal among compared images by different plural processing units. Consequently, even in the case in which an object of inspection is a semiconductor wafer and a difference in brightness occurs in an identical pattern among images due to a difference in thickness in the wafer, or where there is a fluctuation in the quantity of illumination light and a fluctuation in the sensitivity for each pixel of the image sensor, or unevenness in the quantity of light accumulation time, a defect can be detected correctly.

These and other objects, features and advantages of the invention will be apparent from the following more particular description of preferred embodiments of the invention, as illustrated in the accompanying drawings.

BRIEF DESCRIPTION OF THE DRAWINGS

In the accompanying drawings:

FIG. 4A is a diagram showing an inspection object image at the time when there is unevenness in brightness among compared chips in an example of a conventional threshold value setting method;

FIG. 4B is a diagram showing a reference image in the conventional threshold value setting method;

FIG. 4C is a difference image in the conventional the threshold value setting method;

FIG. 4D is a waveform diagram of a differential value in position 1D-1D';

FIG. 10A is a diagram illustrating processing for adjusting a difference in brightness which occurs in a belt shape and shows an example of adjusting the brightness in a row direction;

FIG. 10B is a diagram illustrating processing for adjusting a difference in brightness which occurs in a belt shape and shows an example of adjusting the brightness in a column direction;

FIG. 10C is a diagram illustrating processing for adjusting a difference in brightness which occurs in a belt shape and shows an example of adjusting the brightness in a row direction and a column direction;

FIG. 11A is a diagram showing an example of a result of processing by a brightness correction unit and shows a difference image after alignment;

FIG. 11B a diagram showing an example of a result of processing by the brightness correction unit and shows an image in which a difference in brightness is corrected at a high frequency (by a unit of linear or belt-like area);

FIG. 11C a diagram showing an example of a result of processing by the brightness correction unit and shows an image in which a difference in brightness is corrected at a low frequency (by a unit of a wide area);

FIG. 11D is a diagram showing an example of a result of processing of the brightness correction unit and shows a luminance waveform diagram along line 1D-1D' in FIG. 11A;

FIG. 11E is a diagram showing an example of a result of processing by the brightness correction unit and shows a luminance waveform diagram of FIG. 11C corresponding to line 1D-1D' of FIG. 11A;

FIG. 16A is a graph showing an example of setting a threshold value from characteristic amounts of a defect and a false defect and shows a relation between a density difference value and the frequency of the defect and the false defect;

FIG. 16B is a graph showing an example of setting a threshold value from characteristic amounts of a defect and a false defect and shows a relation between an area and a density difference value of the defect and the false defect;

FIG. 18A is a diagram showing a reference image, a detected image, and a difference image for which the brightness by a unit of belt-like area is adjusted;

FIG. 18B is a graph showing a characteristic amount space which is formed by the reference image and the detected image;

FIG. 18C is a scatter diagram in a characteristic amount space with a brightness of the detected image plotted on the X axis and a brightness of the reference image plotted on the Y axis;

FIG. 18D shows scatter diagrams in which the scatter diagram of FIG. 18C is divided for each characteristic amount;

DESCRIPTION OF THE PREFERRED EMBODIMENT

An embodiment of the present invention will be described in detail with reference to FIGS. 1 to 20.

Figure 1:
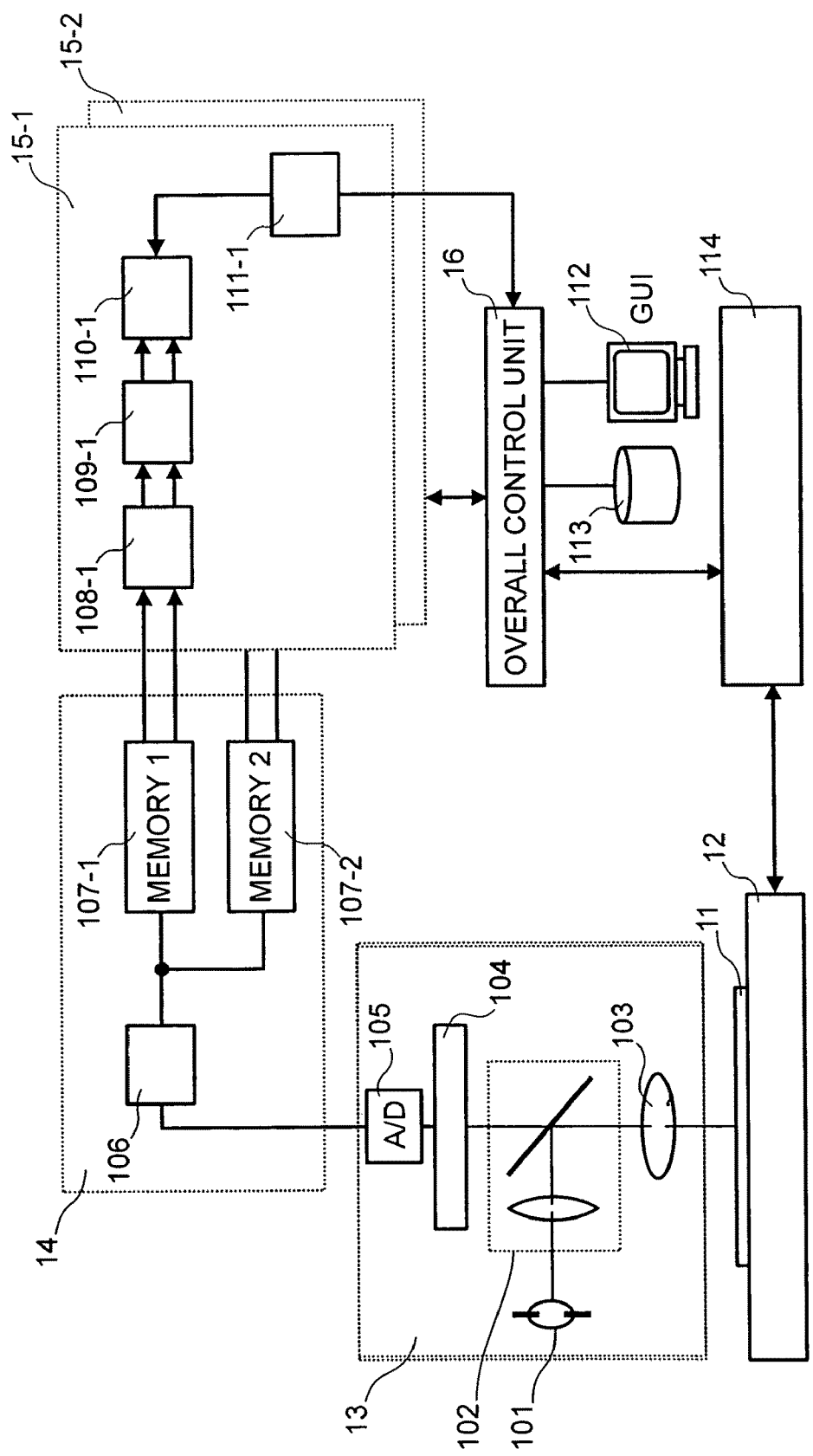
FIG. 1 is a block diagram showing an example of the structure of an inspection apparatus according to the present invention.

As an example of the present invention, a defect inspection method employed in an optical visual inspection apparatus targeting a semiconductor wafer will be considered. FIG. 1 shows an example of the structure of the apparatus. Reference numeral 11 denotes a specimen (an object to be inspected, such as a semiconductor wafer). The apparatus includes a stage 12 on which the specimen 11 is placed and moved; and a detection unit 13, including a light source 101, which illuminates the specimen 11, an illumination optical system 102, which condenses light emitted from the light source 101, an object lens 103, which illuminates the specimen 11 with the illumination light condensed by the illumination optical system 102 and focuses an optical image obtained by reflection of the illumination light, an image sensor 104, which receives the focused optical image and converts the focused optical image into an image signal corresponding to a value of brightness, and an A/D conversion unit 105, which converts an input signal received from the image sensor 104 into a digital signal.

Here, a lamp is used as the light source 101 in the example shown in FIG. 1. However, a laser may be used. In addition, light emitted from the light source 101 may be light of a short wavelength, or it may be light of a wavelength in a wide band (white light). In the case in which light having a short wavelength is used, in order to increase the resolution of an image to be detected (to detect a fine defect), light having a wavelength in the ultraviolet region (ultraviolet light: UV light) may be used.

In addition, it is possible to detect a defect at a relatively high speed and with a high sensitivity by adopting a time delay integration image sensor (TDI image sensor), which is constituted by arranging plural one-dimensional image sensors two-dimensionally, as the image sensor 104, to transfer a signal detected by each one-dimensional image sensor to the one-dimensional image sensor in the next stage in synchronization with movement of the stage 13 and to add up the signals.

The apparatus also includes an image editing unit 14, which includes a pre-processing section 106, which applies image correction, such as shading correction and dark level correction, to a digital signal of an image detected in the detection unit 13, and image memories 107-1 and 107-2 in which digital signals of a detected image to be an object of comparison and a reference image are stored.

The apparatus further includes an image comparison processing unit which calculates defect candidates in a wafer used as a specimen. The apparatus uses plural image comparison processing units (15-1, 15-2). The image comparison processing unit 15-1 compares two images (a detected image and a reference image) stored in an image memory 107-1 of the image editing unit 14 and judges that a part where a differential value is larger than a threshold value is a defect. First, the image comparison processing unit 15-1 reads out digital signals of the detected image and the reference image stored in the image memory 107-1, calculates an amount of positional deviation for adjusting the deviation of positions in a positional deviation detection section 108-1, and calculates an amount of signal correction for adjusting the deviation of the brightness between the detected image and the reference image in a brightness correction section 109-1. Then, the image comparison processing unit 15-1 compares corresponding positions of the detected image and the reference image in brightness in an image comparison section 110-1 using the calculated amount of positional deviation and amount of signal correction, and identifies a part where a differential value is larger than a specific threshold value as a defect candidate. A threshold value setting section 111-1 sets a threshold value, which is used in extracting a defect candidate from a differential value for each area and gives the threshold value to the image comparison section 110-1.

In the image comparison processing unit 15-2, processing is performed according to the same procedure as the image comparison processing unit 15-1 using two images stored in an image memory 107-2.

The apparatus has an overall control unit 16, including a user interface section 112 which provides display means and input means for receiving a change of inspection parameters (a threshold value and the like used in image comparison) from a user and for displaying information on a detected defect, a storage 113 which stores a characteristic amount of a detected defect candidate, an image, and the like, and a CPU (incorporated in the overall control unit 16) which performs various controls. This is a mechanical controller 114 which drives the stage 12 on the basis of a control command received from the overall control unit 16. Note that the image comparison processing units 15-1 and 15-2, the detection unit 13, and the like are also driven according to a command from the overall control unit 16.

Figure 6:
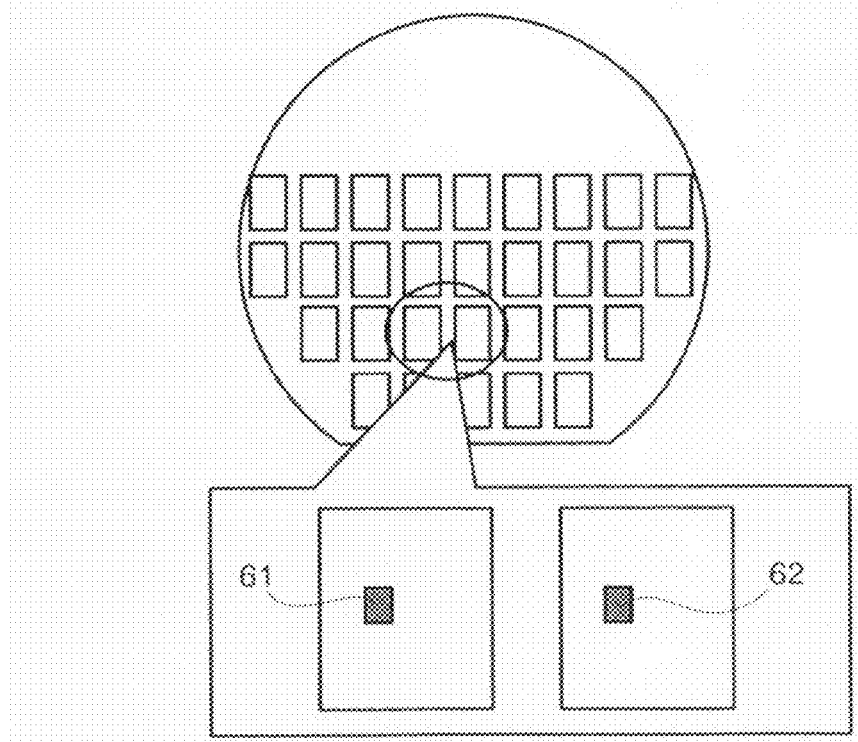
FIG. 6 is a plan view of a semiconductor wafer and shows an enlarged view of a chip.
Figure 7:
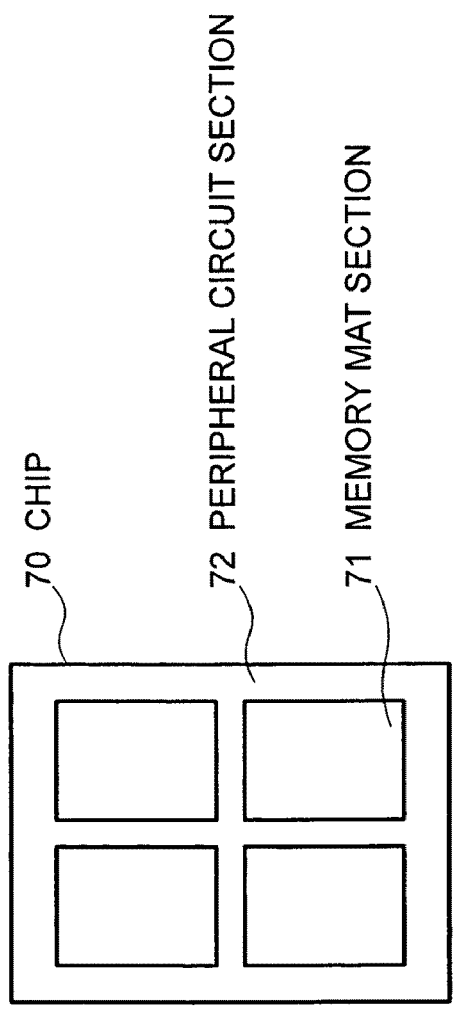
FIG. 7 is a plan view showing an example of the structure of a chip.

In the semiconductor wafer 11 which serves as an object of inspection, a large number of chips of an identical pattern are arranged regularly as shown in FIG. 6. In the inspection apparatus of FIG. 1, the semiconductor wafer 11 is continuously moved by the stage 12 in response to the overall control unit 16, and in synchronization with this, images of the chips are sequentially captured from the detection unit 13, digital image signals of the same positions of two adjacent chips, for example, the area 61 and the area 62 in FIG. 6, are compared as a detected image and a reference image, respectively, according to the above-mentioned procedure, and a difference between the images is detected as a defect.

Figure 2:
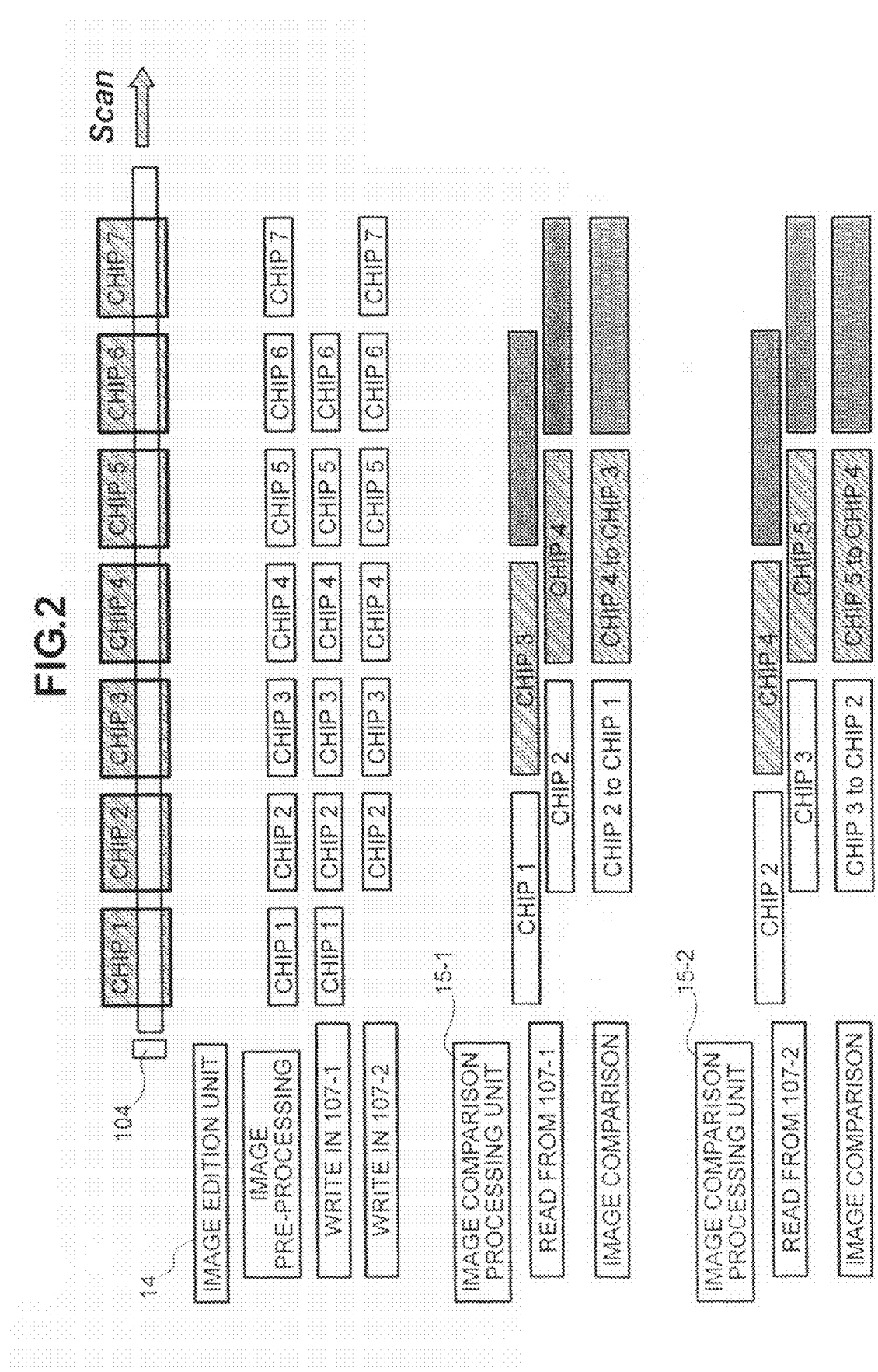
FIG. 2 is an image diagram showing an example of the flow of image data in the course of parallel processing by two image comparison processing units.

Here, the inspection apparatus of this example has the two image comparison processing units 15-1 and 15-2 and performs processing in parallel. In addition, the image memories 107-1 and 107-2 also correspond to the respective image comparison processing units. FIG. 2 is a diagram showing the flow of processing. Here, a case in which seven chips, namely, chips 1 to 7, are inspected will be described.

First, the image sensor 104 sequentially captures images of the chips. In association with the image capturing speed of the sensor, the image editing unit 14 performs pre-processing of the chip images in the pre-processing section 106, and the chip images are written in a memory 107. In this case, the image of the chip I is written in the memory 107-1 for the image comparison processing unit 15-1, the image of the chip 7 is written in the memory 107-2 for the image comparison processing unit 15-2, and the images of the chips 2 to 6 are written in both the memories 107-1 and 107-2. On the other hand, the image comparison processing units 15-1 and 15-2 read out images from the memories 107-1 and 107-2, respectively, at a speed which is half the writing speed, and when two images are readout, image comparison is performed, such as calculation of an amount of positional deviation, calculation of an amount of signal correction, and extraction of defect candidates in parallel with the reading-out of images. The processing speed of the image comparison also is half the image capturing speed of the sensor. The image comparison processing units 15-1 and 15-2 mutually perform inspection of the chips of the other unit in parallel.

Figure 3:
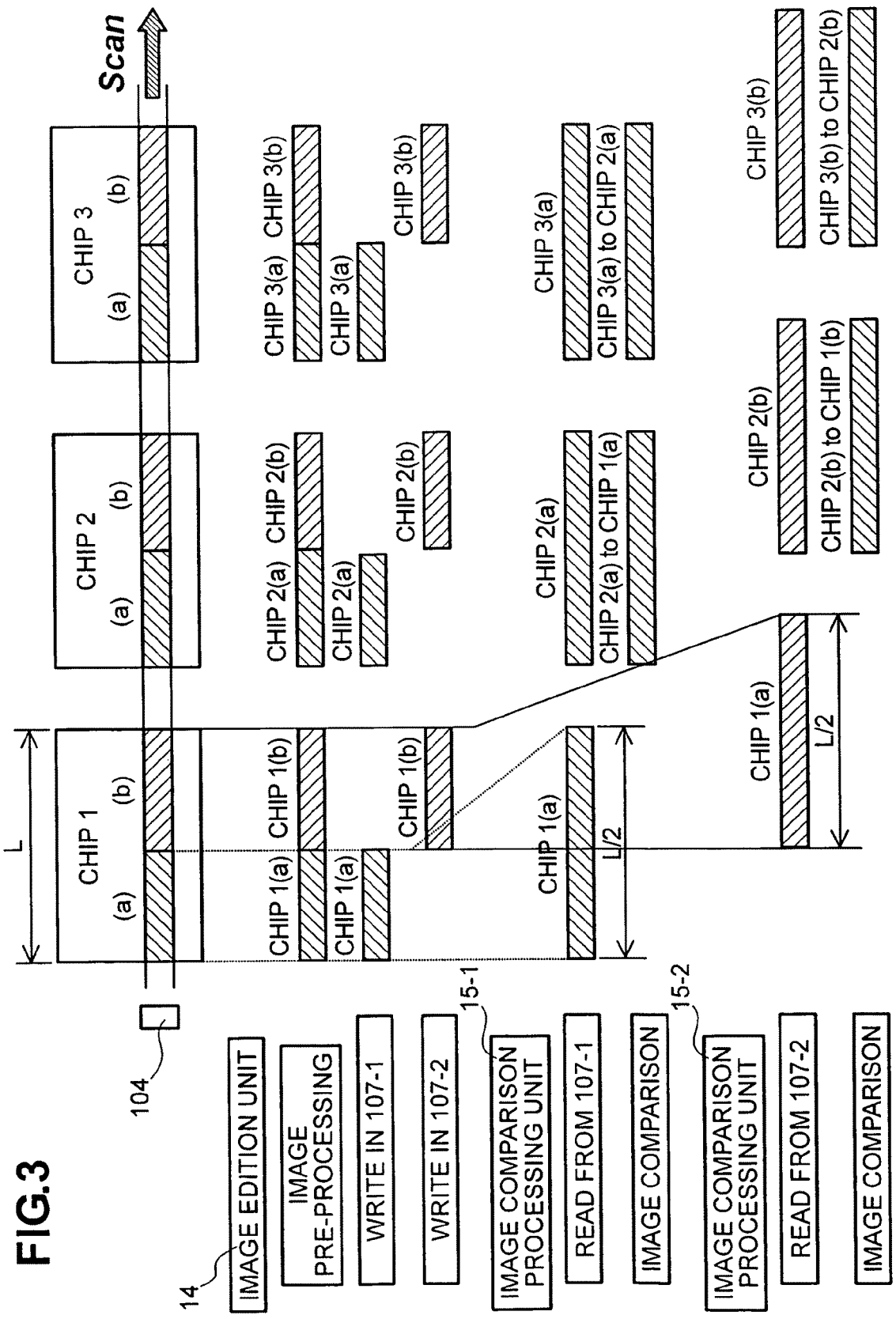
FIG. 3 is an image diagram showing another example of the flow of image data in the course of parallel processing by two image comparison processing units.
Figure 5:
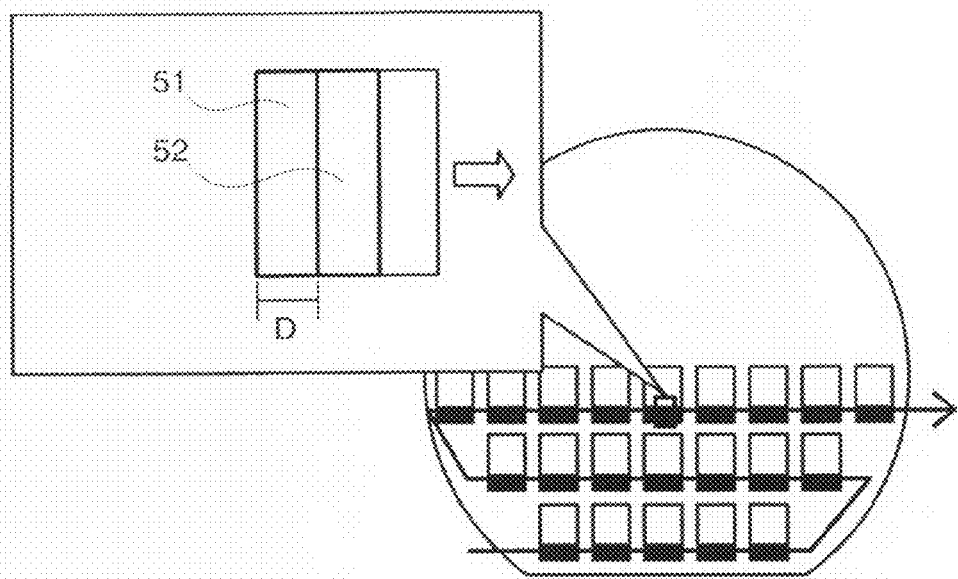
FIG. 5 is a plan view of a semiconductor wafer and shows an enlarged view of an example of an image comparison processing unit.

FIG. 3 is a diagram showing the flow of another kind of processing. Here, in the time for capturing an image of one chip, the two image comparison processing units 15-1 and 15-2 perform image comparison of an area for a half chip, respectively, (e.g., with respect to a length L of the chip, the image comparison processing unit 15-1 performs image comparison of a former half L/2 and the image comparison processing unit 15-2 performs image comparison of a latter half L/2). First, the image sensor 104 sequentially captures the images of the chips. In association with the image capturing speed of the sensor, the image editing unit 14 performs pre-processing of the chip images, and it writes the image of the former half L/2 of each chip in the memory 107-1 for the image comparison processing unit 15-1 and writes the image of the latter half L/2 of each chip in the memory 107-2 for the image comparison processing unit 15-2. On the other hand, the image comparison processing units 15-1 and 15-2 read out images at a speed which is half the writing speed, respectively, and when images for the two chips are read out, image comparison is performed, such as calculation of an amount of positional deviation, calculation of an amount of signal correction, and extraction of a defect candidate in parallel with the reading-out of the images. As shown in FIG. 3, the processing speed for the image comparison is also half the image capturing speed of the sensor. While an image for one chip is captured, the image comparison processing units 15-1 and 15-2 perform inspection for a half length of the chip, respectively, in parallel.

As described above, in a case in which the speed of the detection processing of an image and the speed of the comparison processing are different, in other words, the inspection speed corresponding to the capturing speed of an image sensor can be realized by causing plural image comparison processing units to perform processing in parallel, even if the processing speed of the image comparison processing unit 15 is half the image capturing speed for an object chip by the image sensor 104 and the image editing speed. For example, if the image capturing speed of the image sensor is 1.6 Gpps (pps: pixel per second) at the fastest, when it is converted from a relation of an amount of acquired light or the like, even if the processing capability of the image comparison processing unit 15 is only 0.8 Gpps, which is half the image capturing speed, it becomes possible to realize an inspection processing speed of 1.6 Gpps by adopting this constitution. Naturally, even in the case in which the speed of the image sensor is higher, it is possible to cope with this speed by constituting the image comparison processing unit 15 described above with three or more image comparison processing units to cause them to process the acquired image signals in parallel. In addition, it is also possible to cope with a case in which an image capturing range of the image sensor is increased.

In the above-mentioned embodiment, a case in which the image sensor 104 has a single output is described. However, even if the image sensor 104 is of a type provided with plural output terminals and outputs plural signals in parallel, signals can be processed in the same manner as the above-mentioned embodiment to perform image processing at a higher speed. In this case, plural signal lines are led out from the image sensor 104, and the plural signal lines are connected to plural A/D converters 105 corresponding thereto, respectively, and outputs from the plural A/D converters 105 are inputted to the image editing unit 14 and are processed in the procedure as described above.

Next, the processing in the image comparison processing units 15-1 and 15-2 will be described in detail. First, the detected image signal and the reference image signal to be continuously inputted to the memory 107 are read out in synchronization with the movement of the stage. Since these image signals of two chips are not signals that relate completely to the same position if the stage is vibrated or a wafer set on the stage is inclined, the amount of positional deviation between the two images is calculated in the positional deviation detection section 108. The calculation of the amount of positional deviation is sequentially performed with a specific length in the traveling direction of the stage as one processing unit. Reference numeral 51, 52, ... in FIG. 5 denote respective processing areas in the case in which a length D (pixel) is treated as one processing unit. This unit processing area will be hereinafter described as a unit.

In this way, the amount of positional deviation is sequentially calculated unit by unit with respect to an image to be inputted, for example, the amount of positional deviation is calculated in the unit 51 and a unit of an adjacent chip corresponding to the unit 51, and then the amount of positional deviation is calculated in the unit 52 and a unit of an adjacent chip corresponding to the unit 52. For the calculation of an amount of positional deviation, there are various methods using normalized cross correlation among images, a sum of density differences among images, a sum of squares of density differences among images, and the like. Any of such methods may be used. Further, the alignment of two images is performed unit by unit on the basis of the calculated amount of positional deviation.

Here, in order to perform highly accurate alignment with respect to an amount of positional deviation calculated unit by unit, in accordance with the present invention, the reliability of the amount of positional deviation calculated in each unit is evaluated (e.g., in the case in which an amount of positional deviation is calculated according to normalized cross correlation, a magnitude of a correlation coefficient). In a unit with low reliability (e.g., small correlation coefficient), the amount of positional deviation calculated in the unit is not used, and the amount of positional deviation is calculated from an amount of positional deviation calculated in a unit with higher reliability before or after (in terms of time) the unit by interpolation or extrapolation. Consequently, it becomes possible to perform alignment following distortion of an image due to vibration of the stage even in the case in which there is only a little pattern information for calculation of the amount of positional deviation of the unit.

On the other hand, in the case in which plural output signal lines are connected to plural A/D converters 105 from the image sensor 104, and outputs from the plural A/D converters 105 are inputted to the image processing unit 14, the calculation of an amount of positional deviation unit by unit is also performed in parallel, and the alignment is also performed in parallel. A unit of an area which is divided in a direction perpendicular to a traveling direction of the stage and in which parallel processing is performed is hereinafter described as a channel. Here, in order to perform highly accurate alignment by a unit of a channel as well following distortion, such as vibration of the stage and fluctuation in magnification of an optical system, it is also possible to extract an amount of positional deviation with high reliability (e.g., with a high correlation coefficient) from plural amounts of positional deviation calculated for each channel, subject the extracted plural pieces of positional deviation information to processing, such as compilation and statistical processing, to calculate an amount of positional deviation of a channel with low reliability.

As an example of the calculation, one amount of positional deviation of a channel with highest reliability among all channels is found and is set as an amount of positional deviation of a channel with low reliability. Alternatively, plural pieces of positional deviation information with high reliability are subjected to processing, such as compilation and statistical processing, to uniquely calculate an amount of positional deviation common to all the channels to set the amount of positional deviation as an amount of positional deviation for each channel. Alternatively, it is also possible to interpolate an amount of positional deviation of a channel with low reliability from amounts of positional deviation of plural channels with high reliability by interpolation or extrapolation. The interpolation or extrapolation may be performed by linear interpolation, or distortion due to vibration or the like may be represented by curve approximation, such as spline approximation. Consequently, it becomes possible to perform alignment following distortion of an image due to vibration of the stage or the like, even in the case in which there is only a little pattern information for calculation of an amount of positional deviation of a channel.

Next, the amount of signal correction for adjusting for a deviation in brightness in the brightness correction section 109 is calculated for the aligned two images. As a cause of the deviation of brightness, there are factors such as (1) slight difference in the thickness among chips of a semiconductor wafer serving as an object to be inspected, (2) a difference in the sensitivity of each pixel of an image sensor, (3) a difference in the amount of accumulated light due to unevenness of the speed of movement of a stage, and (4) fluctuation in an amount of illumination light. Among the factors, whereas factor (1) occurs at random depending upon a pattern of the semiconductor wafer, factors (2), (3), and (4) occur linearly or in a belt shape on a detected image as characteristics inherent in the inspection apparatus.

Thus, in accordance with the present invention, first, a difference in the brightness, which occurs in a belt shape as in factors (2), (3), and (4), is adjusted at a specific high frequency, and a difference in the brightness, which occurs at random as in factor (1), is adjusted at a period different from the period (i.e., in a different processing area).

Figure 8:
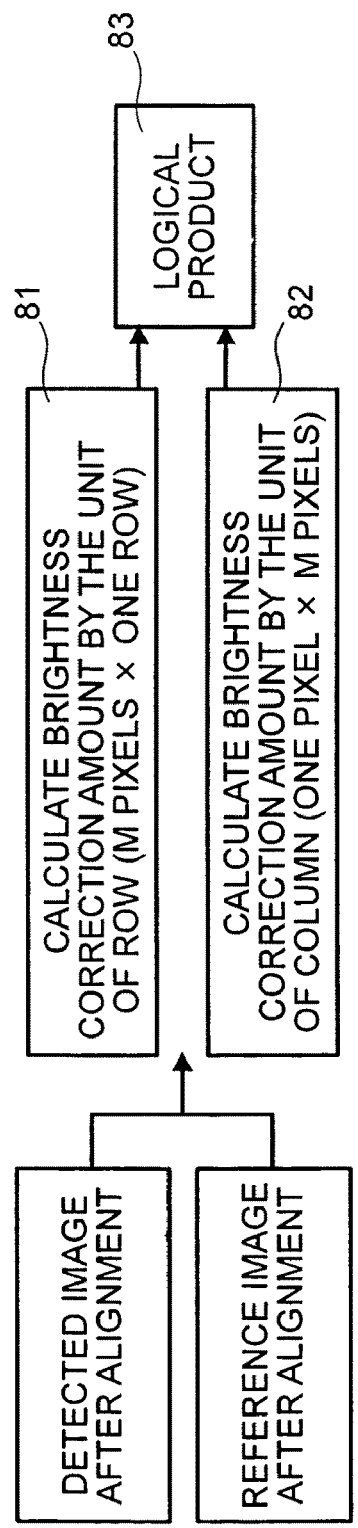
FIG. 8 is a flow diagram showing a flow of processing for adjusting a difference in brightness which occurs in a belt shape.

FIG. 8 shows a flow of processing for the adjusting a difference in the brightness which occurs linearly or in a belt shape. First, with respect to a detected image or a reference image for which alignment has been performed, the amount of correction required for adjusting for an unevenness in the brightness (unevenness of brightness by a unit of row), which occurs in a direction perpendicular to the traveling direction of the stage, is calculated (step 81 in FIG. 8).

An example of a method of calculating the amount of correction of brightness at a highest frequency, that is, for each row, will be described below. First, as shown in FIG. 10A, with respect to an object row (M pixels×one row), an amount of correction for adjusting the brightness is calculated using a value of N rows (N pixels×N rows) in the vicinity including the row. As an example of a method of calculating the amount of correction, a statistical amount is calculated as indicated by expression (1) below.

$$E_f = \frac{1}{(N \times M)} \sum_N \sum_M F(i, J)$$ expression (1)

$$E_G = \frac{1}{(N \times M)} \sum_N \sum_M G(i, j)$$

$$\sigma_f \sqrt{\frac{1}{(N \times M)}\left\{\sum_N \sum_M (F(i, j) - E_f)^2\right\}}$$

-continued $$\sigma_G \sqrt{\frac{1}{(N \times M)}\left\{\sum_N \sum_M (G(i, j) - E_G)^2\right\}}$$

Here, F(i, j) and G(i,j) indicate the brightness of a detected image and a reference image after alignment in a position (i, j). Then, an amount of correction is calculated as indicated by expression (2) below.

$gain_x = \sigma_F/\sigma_G$ $offset_x = E_f - gain \cdot E_G$ expression (2)

Correction of the object row is performed with respect to the reference image as indicated by expression (3) below.

$G_x(i,j) = gain_x \cdot G(i,j) + offset_x$ expression (3)

Similarly, an amount of correction for adjusting unevenness in the brightness (unevenness of brightness by a unit of column), which occurs in parallel with the traveling direction of the stage, is calculated (step 82 in FIG. 8). First, as shown in FIG. 10B, an amount of correction for adjusting the brightness is calculated with respect to an object column (one column×L pixels) using a value of N columns (N columns×L pixels) in the vicinity including the column, and correction of the object column is performed with respect to the reference image as indicated by expression (4) below.

$Gy(i,j) = gain_y \cdot G(i,j) + offset_x$ expression (4)

Then, as shown in FIG. 10C a logical product is found to calculate an amount of correction of a brightness of each pixel which occurs linearly or in a belt shape (step 83 in FIG. 8).

If $(F(i,j)-Gx(i,j))<(F(i,j)-Gy(i,j))$—Amount of correction=gainx, offsetx

Otherwise—Amount of correction=gainy, offsety

Next, an amount of correction for adjusting for a difference in the brightness, which occurs at random depending upon the pattern of a semiconductor wafer, is calculated at a frequency different from the amount of correction for the linear difference of brightness, that is, for each area of a different size.

As shown in the final difference image shown in FIG. 10C, a belt-like difference of brightness (noise), which occurs vertically or horizontally in a traveling direction of the stage, is reduced by finding a logical product of the respective pixels. However, the difference in the brightness which occurs at random remains without being corrected. Consequently, in accordance with the present invention, adjustment of the brightness targeting the random noise, which remains in this way, is performed next. An example of a procedure therefor is shown in FIGS. 17 and 18A to 18C.

First, as shown in FIG. 18A to 18C, with respect to a detected image and a reference image for which a belt-like brightness is adjusted, a characteristic amount of each pixel in a specific area is calculated to form a characteristic space of two-dimensions or more, as shown in FIG. 18A (17-1). The characteristic amount maybe any amount as long as it indicates a characteristic of each pixel such as the contrast, the brightness, a second deviation value, a density difference between corresponding pixels, or a variance value using a near-field pixel. Next, the characteristic space is divided into plural segments (17-2), and an amount of correction is calculated for each segment using a statistical amount of pixels belonging to the segment (17-3). This is equivalent to, with respect to each pixel in areas of the detected image and the reference image, resolving a scatter diagram 18B according to pixels in the areas, in which a brightness of the detected image is plotted on the X axis and a brightness of the reference image is plotted on the Y axis, as shown in FIGS. 18C and 18D, according to the characteristic amount, and an amount of correction is calculated in each scatter diagram.

FIGS. 19A and 19B show an example of a division method for dividing the characteristic space of FIG. 18A into segments. In accordance with the present invention, the segment division is automatically performed according to an object image. The upper graph in FIG. 19A shows an example of a characteristic space according to a brightness and a density difference, and the lower graph is a histogram showing the frequency of each brightness (luminance value), which is an example of determining a division threshold value in a brightness direction from a histogram of brightnesses of an object image.

Figure 20:
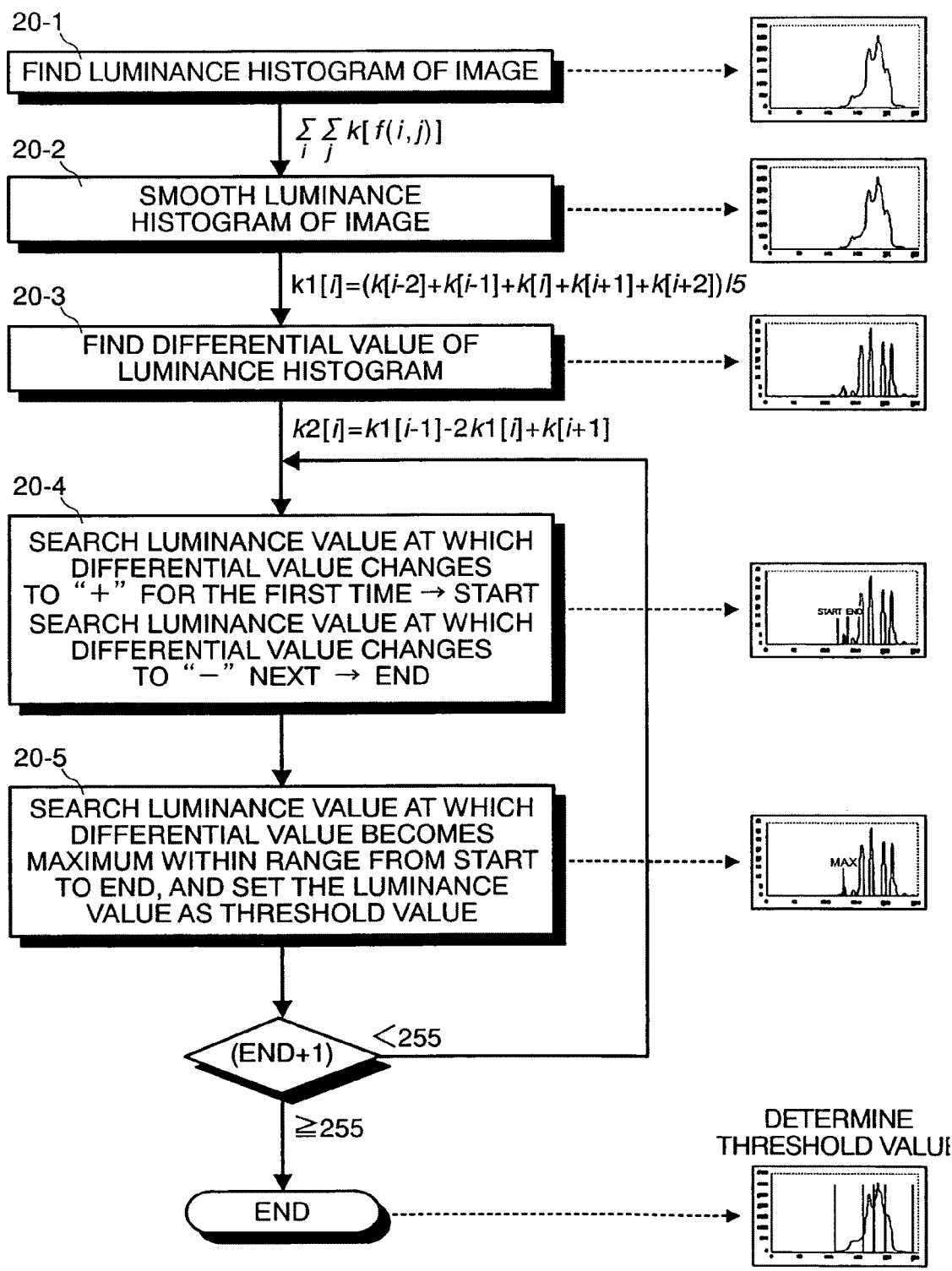
FIG. 20 is a flow diagram showing a processing procedure for calculating a divided threshold value for the segment division.

FIG. 20 is a flow diagram which shows an example of a processing procedure therefor. First, a histogram of luminance values in an object area is calculated (20-*b*). This may be calculated from the detected image or the reference image, or it may be calculated from an average value of two images. Next, the luminance histogram is smoothed to remove a small peak or the like (20-2), and a differential value of the smoothed histogram is calculated (20-3). Next, the differential value is checked from the side of lower brightness, and a luminance value at which the value changes to a positive value is set as a Start and a luminance value at which the value changes to negative value next is set as an End (20-4). Then, a luminance value at which the differential value is maximized in a range from Start to End is set as a threshold value for division (20-5).

Consequently, as shown in FIG. 19A, the division is performed in the part of the trough of the histogram. This indicates that the segment division is performed according to a pattern in the object area. It is possible to divide a luminance value according to the pattern in the image. It is also possible to divide a luminance value according to a fixed value set by a user as shown in FIG. 19B.

For the amount of correction of each scatter diagram resolved by the segment division, a linear equation is found by a least square approximation within the scatter diagram, as shown in FIGS. 18C and 18D, and an inclination and a y intercept are set as an amount of correction. In addition, an amount of correction may be found from pixels belonging to each segment, as shown in the above-mentioned expression 1 and expression 2. Further, an area for forming a characteristic space can be set as an arbitrary area of pixels of 1×1 or more. However, since a defect is also adjusted if correction is performed with a 1×1 pixel of a highest frequency, the area is set so as to be slightly larger.

A result of the correction is shown in FIGS. 11A to 11E. FIG. 11A shows a difference image after alignment. A defect is in the encircled part. FIG. 11D shows a luminance waveform of two images after alignment of 1D-1D' including the defect part and a differential value at that point. The detected image has a defect, and the defect part is brighter than the part around it. However, the reference image is generally bright, and a differential value of the defect part is smaller than the part around it. On the other hand, FIG. 11B shows a difference image after correcting a difference of linear brightness at a high frequency. Belt-like unevenness of brightness is corrected. As a result, the luminance value is adjusted, as shown in FIG. 11E, and the defect is made manifest. However, this depends upon a repetitive pattern, and a difference in the brightness which occurs at random is not corrected.

FIG. 11C shows a difference image after calculating an amount of correction from a statistic amount of an area (in this example, the entire area of the image of FIG. 11B), which is different from the adjustment of a linear noise, and correcting a difference in the brightness. In this way, the amounts of correction are calculated in two or more different processing areas, whereby it becomes possible to correct the differences in brightness which occur in different circumstances, and to make manifest a defect of a feeble signal, which is embedded and invisible in a strong unevenness of the brightness; and to detect the defect.

In accordance with the present invention, with respect to the remaining random noise, adjustment of the brightness can be further performed for each area with similar characteristics. For example, when a characteristic space is formed in both a bright area, such as the peripheral circuit section 72 of FIG. 7, where a false defect easily occurs, and the memory mat section 71, and an amount of correction is calculated, it is likely that a defect in the memory mat section 71 will be corrected. Thus, characteristic spaces are formed separately in the memory mat section 71 and the peripheral circuit section 72. In addition, some memory mat sections or some peripheral circuit sections are in an area where noise easily occurs, and other memory mat sections or other peripheral circuit sections are in an area where noise does not easily occur. In such a case, characteristic spaces are also formed separately. The areas can be divided on the basis of design information of chips, such as CAD data, chip layout data, or chip images, or they can be divided on the basis of a result of a test inspection. In addition, an area forming one characteristic space may be discrete (discontinuous). A method of dividing an area may be described in detail later.

An effect of performing brightness correction of multiple stages with respect to an inspection image, as described above, will be described for the case of inspecting a pattern, which is formed on a semiconductor wafer covered by an insulating film with an optical transparent and flat surface, through, for example, a CMP process. Images which are obtained by sensing images of the wafer after the CMP processing in the detection unit 13 are affected by distribution of an amount of reflected light or the like, which is caused by fluctuation in thickness of the insulating film in the wafer surface and the irregularity of a pattern in a chip, so as to be changed to images with a brightness that fluctuation depending upon the location on the wafer. By performing brightness correction in multiple stages at different frequencies with respect to an image that is subject to fluctuation in brightness according to the method described above, the influence of the fluctuation in brightness among the images can be reduced to make the defect manifest. Thus, it becomes possible to improve the rate of detection of a defect.

In this way, after calculating the amount of correction for adjusting for a difference in the brightness using plural processing units, a comparison of the brightness in corresponding positions of two images is performed in the image comparison section 110 using an amount of positional deviation and amounts of signal correction which are calculated at two different periods. Then, a part where a differential value is larger than the threshold value TH is detected as a defect.

Figure 9:
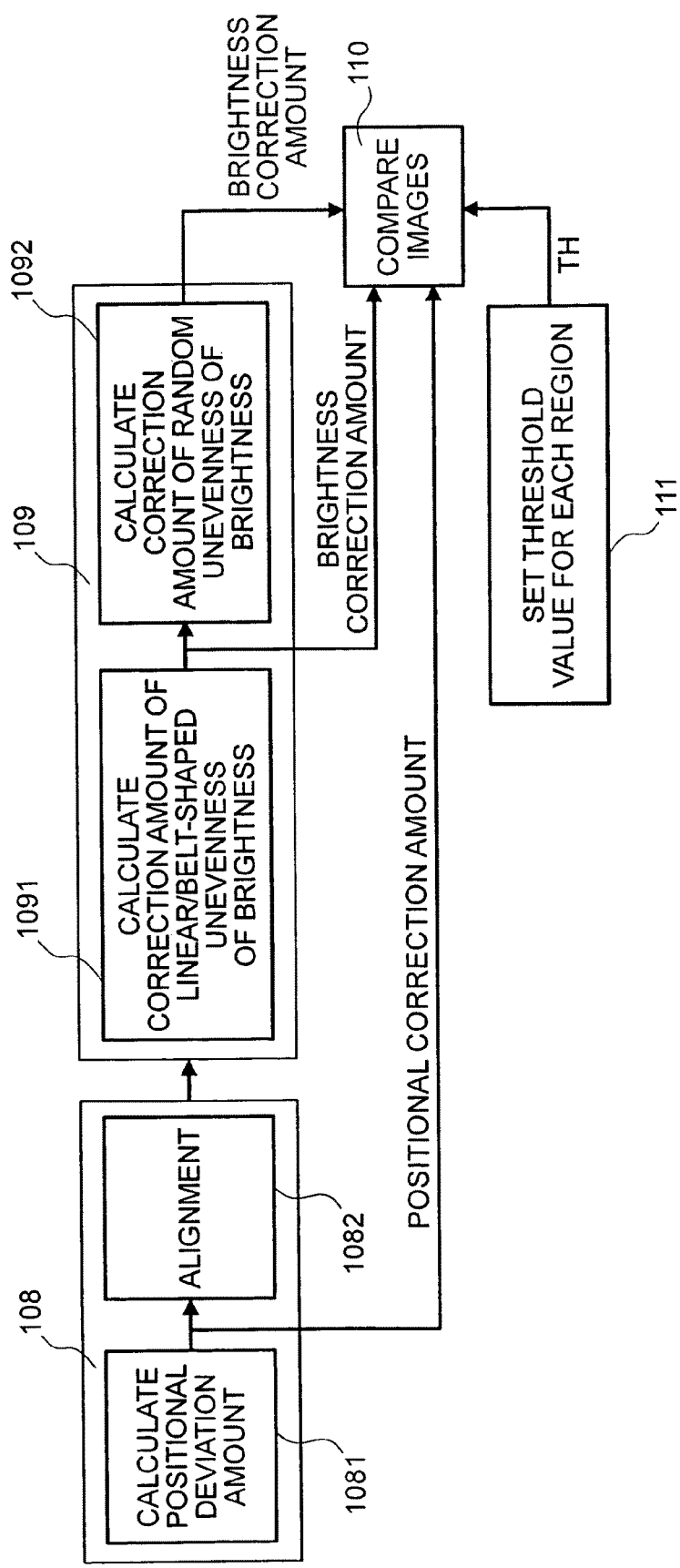
FIG. 9 is a flow diagram showing a flow of processing in the image comparison processing unit.

To summarize the flow of this processing, as shown in FIG. 9, in the image comparison processing unit 15, first, an amount of positional deviation between a detected image and a reference image is calculated from an image signal, which is received from the image editing unit 14, in the positional deviation correction section 108 (1081), and positional deviation of the detected image and the reference image is corrected on the basis of this calculated amount of deviation (1082). Next, in the brightness correction section 109, an amount of correction of brightness unevenness between corresponding linear and belt-like areas of the detected image and the reference image is calculated (1091), and then an amount of correction of random brightness unevenness between corresponding areas of the detected image and the reference image is calculated for each area that is larger than the linear and belt-like areas (1092).

Next, in the image comparison section 110, a differential image of the detected image and the reference image, which is corrected using information on the amount of positional deviation between the detected image and the reference image calculated in the positional deviation correction section 108, information on the brightness unevenness between the linear and belt-like areas calculated in the brightness correction section 109, and information on the amount of correction of random brightness unevenness calculated for each area larger than the linear and belt-like areas, is compared with the threshold value signal from the threshold value setting section 111 to detect a defect.

Here, in a semiconductor wafer which serves as an object of inspection, depending upon the position on a chip, there is an area which is not intentionally detected, even if the noise is large, a false defect easily occurs, or there is a defect in the area, because damage due to the noise, the false defect, or the defect is small. For example, in FIG. 7, the memory mat section 71 consists of a set of small repetitive patterns (cells), and the peripheral circuit section 72 is basically a set of random patterns. In general, in the memory mat section 71, the pattern density is high and an image obtained by a bright-field illumination optical system tends to be dark. On the other hand, in the peripheral circuit section 72, the pattern density is low and an image to be obtained tends to be bright. Further, in an area in which an image signal to be inputted is large (bright area), such as the peripheral circuit section 72, since the level of noise is large and a false defect easily occurs, it is necessary to set the threshold value TH slightly larger. On the other hand, in the memory mat section 71, since an image signal to be obtained is small (the section is dark), it is necessary to set the threshold value TH smaller and perform inspection with high sensitivity.

In addition, in the case in which a difference in the brightness occurs locally due to a difference in the thickness in a specific pattern area between chips as shown in FIGS. 4A and 4B, a false defect easily occurs in this part. Thus, it is necessary to set the threshold value TH slightly larger. On the other hand, in the case in which a comparison is performed using only the threshold value TH for the entire area, it is inevitable to set a slightly larger threshold value which is suited to an area with large noise or an area where a false defect easily occurs. Thus, the sensitivity in the other areas falls. Therefore, as a method of performing inspection with a high sensitivity over the entire area, the present invention provides means for setting the threshold value according to an area.

Figure 12:
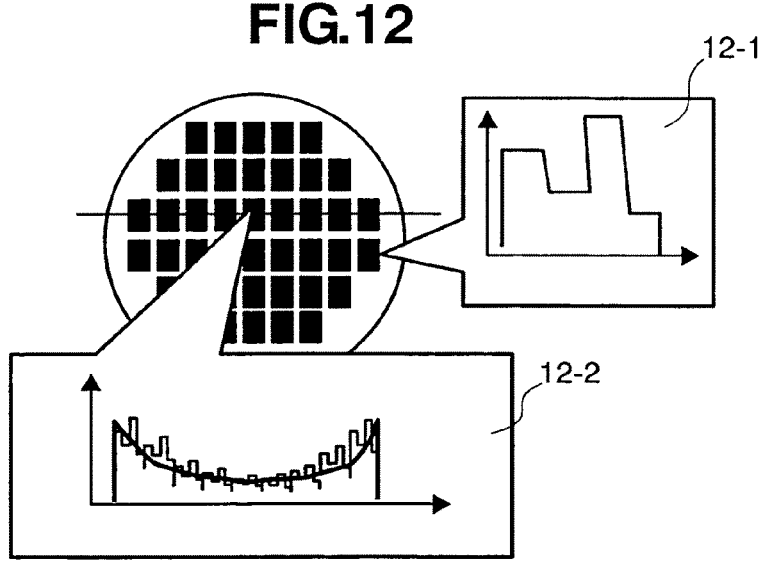
FIG. 12 shows an example of a proper threshold value according to coordinates in a wafer and coordinates in a chip in a plan view of a semiconductor wafer.
Figure 13:
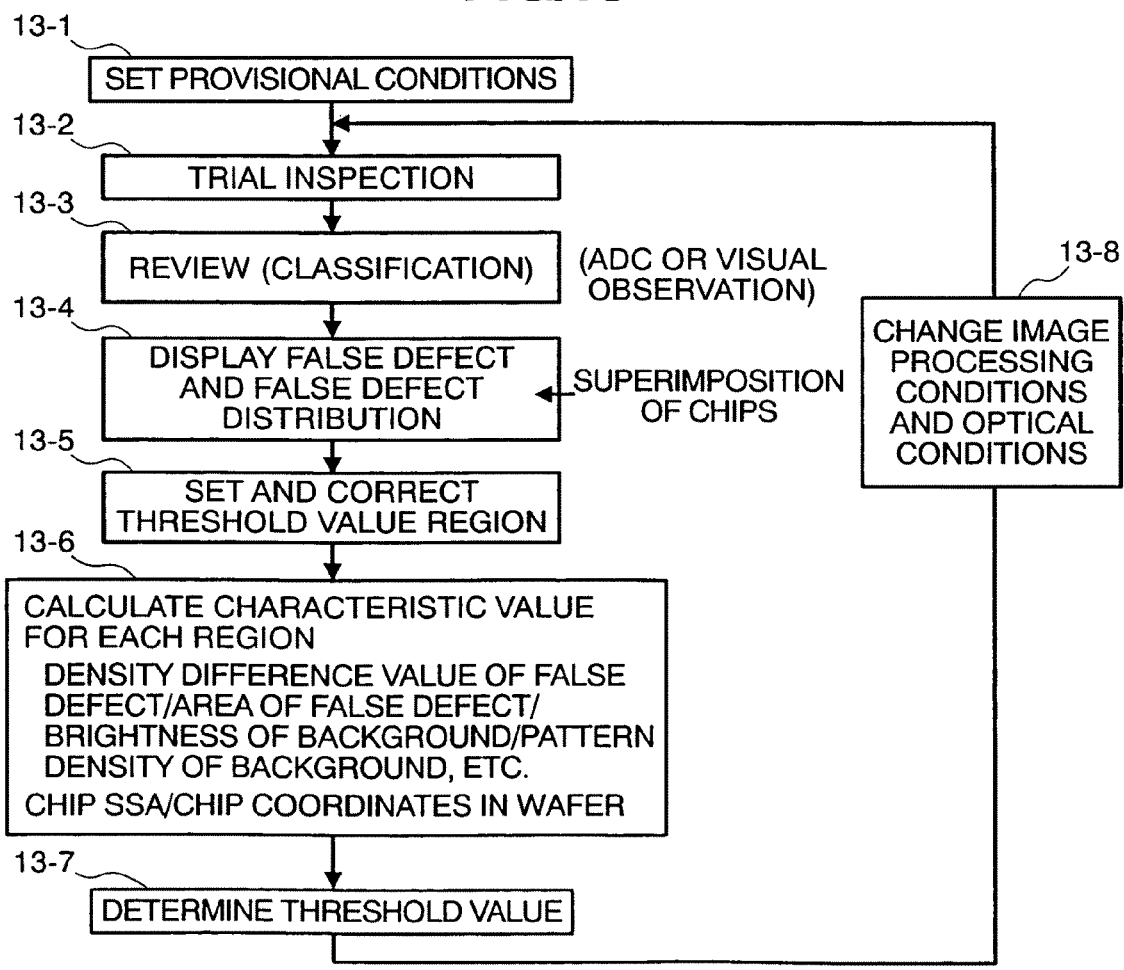
FIG. 13 is a flow diagram showing a flow of processing for setting a threshold value for each of the coordinates in a wafer and the coordinates in a chip.
Figure 14:
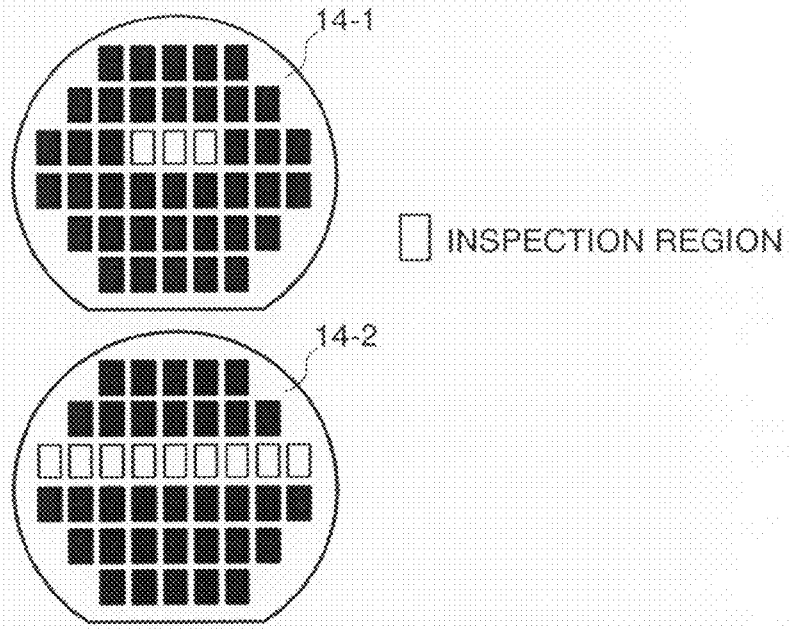
FIG. 14 is a plan view of a semiconductor wafer showing an example of inspection chip setting at the time of trial inspection.

The characteristics 12-1 in FIG. 12 indicates a threshold value for preventing a false defect from occurring in a certain position in a chip, indicating that it is necessary to set different threshold values according to an area. Moreover, in a semiconductor wafer, a difference in the brightness between chips tends to be larger in a part closer to the periphery of a wafer. The characteristic 12-2 in FIG. 12 indicates a threshold value for preventing a false defect from! occurring in a certain position in the wafer, indicating that it is necessary to set different threshold values according to the position of a chip. In order to realize a highly sensitive inspection over the entire area of the inspection area in this way, in the threshold value setting section 111 of FIGS. 1 and 9, a threshold value is set for each position of the chip in the wafer and each position in the chip. An example of a procedure for effecting such setting is shown in FIG. 13.

First, a user sets general conditions (13-1) and performs a trial inspection (13-2). In this case, if only a threshold value according to a pattern in a chip is set, an area for one chip is set as an inspection area (14-1 in FIG. 14). If a threshold value according to a position of a chip in a wafer is further set, chips on the entire surface of the wafer, or at least from an end to an end of the wafer, are set as an inspection area (14-2 in FIG. 14). Then, the user visually confirms the presence of detected defect candidates and classifies them into real defects and false defects (13-3). For such confirmation, an image, which is sensed by image sensing means different from that used at the time of actual inspection, such as a high magnification camera, or an image used for the actual inspection, may be used. In this case, it is also possible to perform auto defect classification (ADC) or the like in parallel with the inspection and to automatically classify defect candidates into defects and false defects using a result of the auto defect classification or the like without intervention of the user. Then, a result of classification is displayed together with the chip, such that it can be seen at a glance where in the chip the occurrence of false defects are concentrated (13-4).

Figure 15:
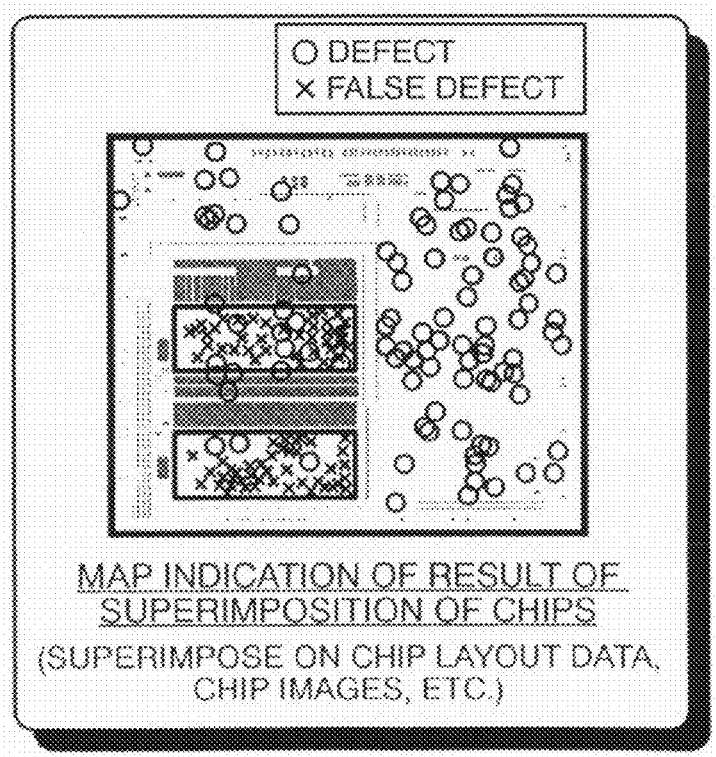
FIG. 15 is a front view of a displayed screen showing an example of superimposed indication of design data of a chip and processing results.
Figure 17:
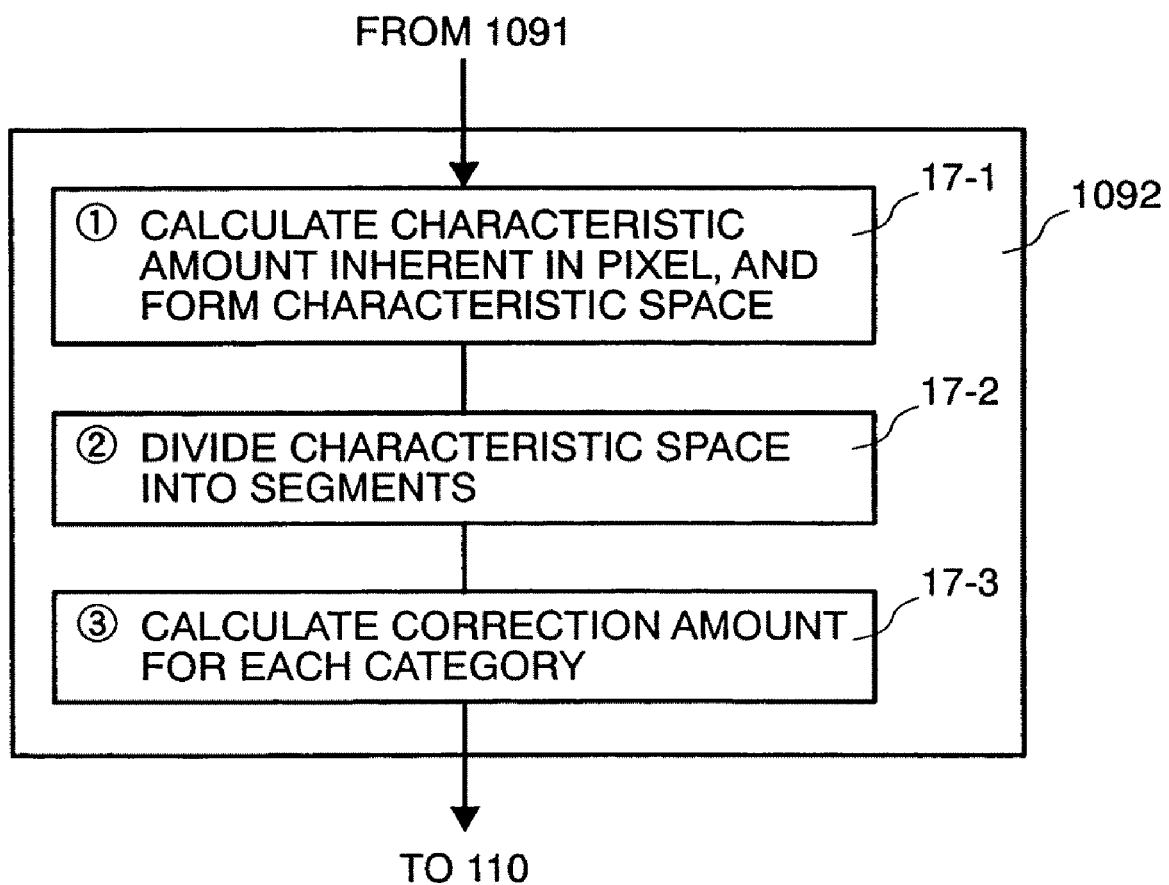
FIG. 17 is a flow diagram showing a flow of processing for adjusting a difference of brightness which occurs at random.
Figure 19:
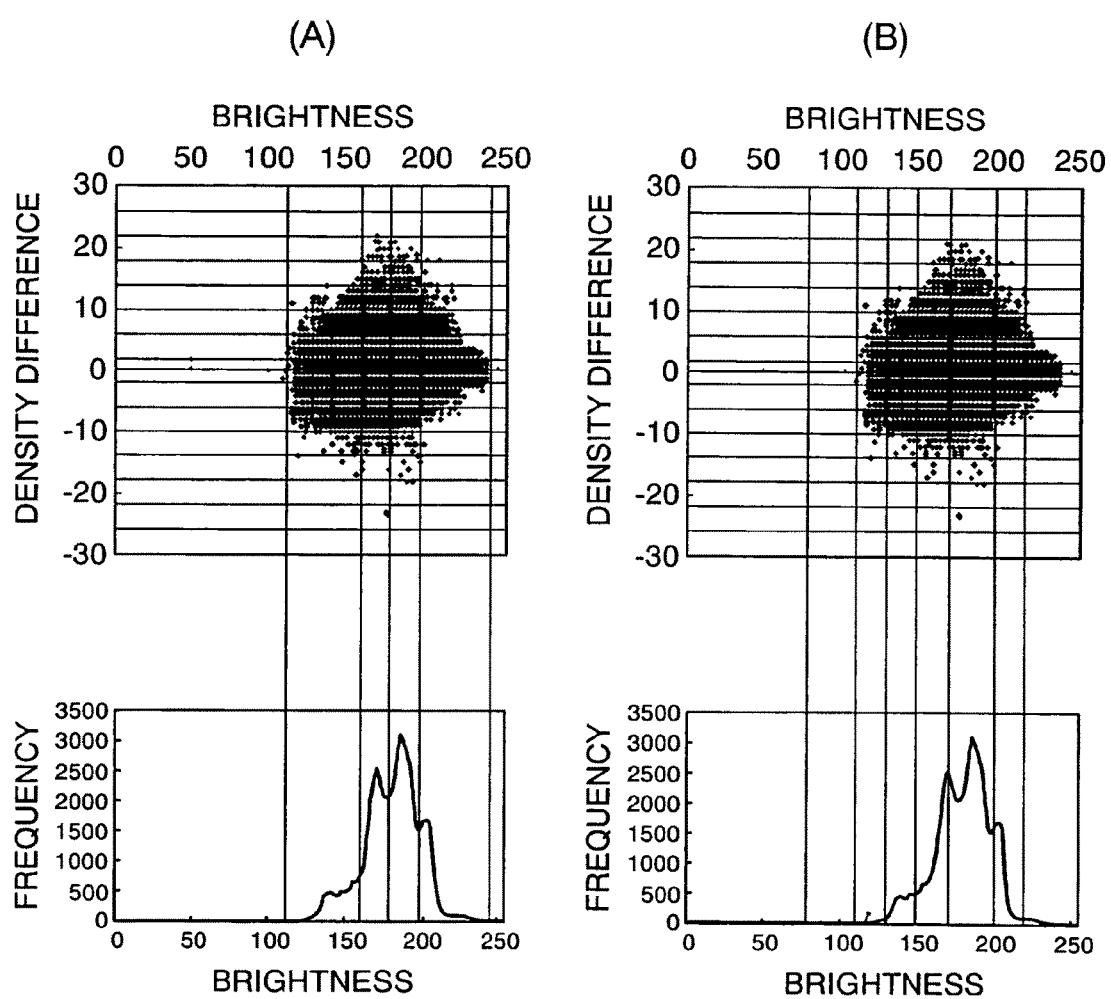
FIGS. 19A and 19B are diagrams showing an example of a segment dividing method for a characteristic space.

In the case in which plural chips are set as an inspection area, the results of inspection in the respective chips are superimposed. Looking at the superimposed results, the user sets an area where the user wishes to decrease the sensitivity, that is, an area where the threshold value is to be increased, and an area where the user wishes to increase sensitivity, that is, an area where the threshold value is to be decreased. In this case, as shown in FIG. 15, it is also possible to display the areas while being superimposed on design information of the chip, such as CAD data, chip layout data, and a chip image. By superimposition of display areas on the design information, it becomes easier to confirm whether the set areas are appropriate and to change the set areas. In addition, an area can be set automatically from the design information of the chip.

Next, a characteristic amount of an area for setting a threshold value for each set area is calculated (13-6). For example, the characteristic amount is a characteristic amount F(i,j)–G(i,j), an area, or the like, of an area where a false defect occurs, such as a density difference value (a difference in brightness between the detected image and the reference image) of a false defect in an area where the occurrence of a false defect is concentrated, the pattern density, brightness, or the like of an area where a false defect occurs, and the like. In addition, in the case in which a trial inspection is performed in plural chips, the coordinates in a wafer of a chip where the occurrence of a false defect is concentrated, the shape of the occurrence of a false defect in the entire wafer, and the like are also calculated. Then, a threshold value, which is not a false defect, in each area is set from the characteristic amount in each area (13-7). For example, in the area where the occurrence of a false defect is concentrated, the detection of a false defect can be avoided if the threshold value is set to be larger than the density difference value of the false defect.

In addition, as described above, in an area where the pattern density is high or an area where the background is dark, the threshold value is set slightly lower because a false defect does not easily occur. On the other hand, in an area where the pattern density is low or an area where the background is bright, the threshold value is set to be slightly higher because a false defect easily occurs. Further, the threshold value is set slightly higher in a chip which is spaced from the center of a chip or a wafer where a false defect is concentrated. Since information such as the pattern density and the brightness of the background can be obtained from an image, division of an area is performed automatically.

As shown in FIG. 16A, the threshold value is basically set automatically from the density difference value of a false defect, but it may be set with reference to a threshold value set by the user in advance. In addition, as shown in FIG. 16B, a threshold value for judging detection or non-detection can also be calculated from the density difference value and the area. Naturally, it is also possible for the user to set the area and the threshold value for each area manually. Such automatic setting of the area and automatic threshold setting for each area are performed in section 111 in FIG. 1, and only a defect is detected in the image comparison section 110 using the threshold value.

Moreover, it is also possible to perform inspection with the threshold value determined in 13-7 in step FIG. 13 and repeat steps 13-3 to 13-7 to perform tuning of the parameters. In addition, in this case, steps 13-3 to 13-7 can also be repeated while changing the optical conditions (focal point, amount of light, deflection conditions, etc.) (13-8) to perform tuning of the optical conditions.

As described above, in accordance with the present invention, image comparison processing is performed in parallel in the inspection for comparing two images and detecting a defect from a differential value thereof, whereby an inspection speed equivalent to or close to an image capturing speed of an image sensor can be realized.

For example, if the image capturing speed of the image sensor is 1.6 Gpps (pps: pixel per second) at the fastest, even if the processing capability of the image comparison processing unit 15 is only 0.8 Gpps, which is half the image capturing speed, it becomes possible to realize an inspection processing speed of 1.6 Gpps by adopting a constitution in which two image comparison processing units are provided in parallel, as in the present invention. Moreover, even in the case in which the speed of the image sensor is higher, such as the case in which the image capturing speed of the image sensor becomes equal to or higher than 1.6 Gpps, the case in which an image accumulation time of the image sensor is reduced according to optical conditions, or the case in which the scan width to be scanned by the image sensor at one time is increased, it becomes possible to cope with the case without speeding up the image comparison processing itself by increasing the number of image comparison processing units to N. For example, even in the case in which the image capturing speed of the image sensor is further increased to 6.4 Gpps at the fastest, it is possible to cope with a case having an image processing speed of 6.4 Gpps by arranging eight image comparison processing units 15 with a processing capability of 0.8 Gpps in parallel.

In addition, by adjusting the difference in the thickness among chips, a difference in the sensitivity of each pixel of the image sensor, a difference in the an amount of accumulated light due to unevenness of the stage speed, and a difference in the brightness among the chips which occurs due to various factors, such as fluctuation in illumination (unevenness of colors) at plural different frequencies (i.e., an amount of correction is calculated for each of plural different areas), it becomes possible to manifest a defect of a feeble signal, which is embedded in strong brightness unevenness, and detect the defect.

Further, by dividing an inspection area into plural areas according to coordinates in a wafer and coordinates in a chip to automatically set a threshold value for each divided area, the inspection sensitivity in each area can be optimized, so as to realize a highly sensitive inspection as a whole. In this case, by displaying design information of the chip, such as CAD data and a chip image of the chip so that it is superimposed on a state of occurrence of a false defect or a result of automatic area setting, confirmation and correction of a set area are facilitated. It is also possible for the user to set the threshold value manually.

The processing of the image comparison processing units 15-1 and 15-2 according to the present invention, as described above, is realized by software processing by the CPU. However, it is also possible to change a core arithmetic operation part, such as normalized cross correlation operation and the formation of a characteristic space, to hardware processing by an LSI. Consequently, further speed-up can be realized. In addition, even if there is a large difference in the brightness among compared dies due to a slight difference in the thickness of a pattern after a smoothing process, such as a CMP, or a reduction in the wavelength of the illumination light, it becomes possible to detect a defect of 20 nm to 90 nm according to the present invention.

Moreover, in inspection of a low k film, for example, an inorganic insulating film, such as $SiO_2$, SiOF, BSG, SiOB, or a porous silica film, or an organic insulating film, such as methyl containing $SiO_2$, MSQ, a polyimide film, a parelin film, a Teflon (registered trademark) film, or an amorphous carbon film, even if there is a local difference in the brightness due to in-film fluctuation of a refractive index distribution, it becomes possible to detect a defect of 20 nm to 90 nm according to the present invention.

An embodiment of the present invention has been described with reference to a comparative inspection image in an optical visual inspection apparatus targeting a semiconductor wafer as an example. However, the present invention is also applicable to a comparative image in an electron beam type pattern inspection. In addition, the object of inspection is not limited to a semiconductor wafer, and the present invention is applicable to a TFT substrate, a photomask, a printed board, or the like as long as a defect is detected by comparison of images.

As described above, according to the present invention, by performing image comparison processing in parallel, an inspection speed corresponding to a processing speed depending upon an image capturing speed of an image sensor, an image accumulation time, a scanning width, and the like can be realized.

In addition, by adjusting, at plural different frequencies, a difference of brightness among images to be compared caused by a difference in thickness among chips, a difference in the sensitivity of each pixel of the image sensor, a difference in the amount of accumulated light due to unevenness of the stage speed, a difference in the brightness among the chips which occurs due to various factors, such as fluctuation in illumination (unevenness of colors), or the like, it becomes possible to manifest a defect of a feeble signal, which is embedded in strong brightness unevenness, and detect the defect.

Further, since a threshold value can be set according to coordinates in a wafer and coordinates in a chip, it becomes possible to automatically optimize the inspection sensitivity in various places, so that highly sensitive inspection can be realized. In this case, by displaying design information of the chip and a threshold setting area so as to superimpose one on top of another, adjustment of the sensitivity, such as confirmation and correction of the threshold value setting area, is facilitated.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of inspecting a pattern by using an inspection apparatus, comprising the steps of:

illuminating, with a light, a specimen placed on a stage;

imaging, with an image sensor, corresponding areas of two patterns formed on the specimen, which are originally formed so as to have an identical shape, to obtain a reference image and an inspection image;

correcting a positional difference between the reference image and the inspection image;

correcting a first brightness difference of a corresponding area between the reference image and the inspection image whose positional difference is corrected at the step of correcting a positional difference with a first corrector, the first corrector being specifically adapted to correct the first brightness difference which is caused by at least one of a difference in a sensitivity of each pixel of the imagine sensor, a difference in the amount of accumulated light due to unevenness of the speed of movement of the stage, and fluctuation in an illumination light;

correcting a second brightness difference of the corresponding area between the reference image and the inspection image whose first brightness difference is corrected at the step of correcting a first brightness difference, with a second corrector which is different from the first corrector, the second corrector being specifically adapted to correct the second brightness difference which is caused by the specimen, and a factor which causes said second brightness difference being a slight difference of thin film among chips formed on the specimen;

detecting a defect of the pattern formed on the specimen by using the reference image and the inspection image whose second brightness difference is corrected, wherein said corresponding area in the step of correcting a first brightness difference and said corresponding area in the step of correcting a second brightness difference are different in size from a processing unit area.

2. A method of inspecting a specimen by using an inspection apparatus, comprising the steps of:

imaging corresponding areas of two patterns formed on a specimen, which are originally formed so as to have an identical shape, to obtain a reference image and an inspection image;

correcting a brightness difference between the reference image and the inspection image; and detecting a defect of the specimen by using the brightness difference corrected reference image and the inspection image, wherein the step of correcting a brightness difference further comprises the steps of:

correcting a positional difference between the reference image and the inspection image;

correcting a first brightness difference of a corresponding small area between the reference image and the inspection image whose positional difference is corrected at the step of correcting the positional difference with a first corrector, the first corrector being specifically adapted to correct the first brightness difference which is caused by at least one of a difference in a sensitivity of each pixel of the image sensor, a difference in the amount of accumulated light due to unevenness of the speed of movement of the stage, and fluctuation in an illumination light; and correcting a second brightness difference of a corresponding large area, which includes the small area, between the reference image and the inspection image whose first brightness difference is corrected at the step of correcting the first brightness difference, with a second corrector which is different from the first corrector, the second corrector being specifically adapted to correct the second brightness difference which is caused by the specimen, and a factor which causes said second brightness difference being a slight difference among patterns on the specimen.

3. The method of inspecting a pattern according to claim 2, wherein in the step of correcting a first brightness difference, said first brightness difference occurs as characteristics inherent in the inspection apparatus.

4. The method of inspecting a pattern according to claim 2, wherein in the step of correcting a second brightness difference, said second brightness difference occurs at random depending upon the pattern formed on the specimen.

5. An apparatus for inspecting a pattern, comprising:

an illuminating unit which illuminates, with a light, a specimen placed on a stage;

an imaging unit which captures optical images of corresponding areas of two patterns formed on the specimen with an image sensor, said optical images being originally formed so as to have an identical shape on a substrate, and obtaining a reference image and an inspection image; and an image processing unit which processes the reference image and the inspection image to detect a defect in the inspection image;

wherein the image processing unit comprises:

a positional difference corrector which corrects a positional difference between the reference image and the inspection image;

a first brightness difference corrector which corrects a first brightness difference of a corresponding area between the positional difference corrected reference image and the inspection image, the first brightness difference corrector being specifically adapted to correct the first brightness difference which is caused by at least one of a difference in a sensitivity of each pixel of the image sensor, a difference in the amount of accumulated light due to unevenness of the speed of movement of the stage, and fluctuation in an illumination light;

a second brightness difference corrector which corrects a second brightness difference of a corresponding area between the first brightness difference corrected reference image and the inspection image, the second brightness difference corrector being specifically adapted to correct the second brightness difference which is caused by specimen, and a factor which causes said second brightness difference being a slight difference among images of the specimen; and a defect detector which detects a defect of the pattern formed on the specimen by using the second brightness difference corrected reference image and the inspection image, wherein said corresponding area corrected by the first brightness difference corrector and said corresponding area corrected by the second brightness difference corrector are difference in size from a processing unit area.

6. The apparatus for inspecting a pattern according to claim 5, wherein said image sensor is a TDI image sensor which outputs signals in parallel.

7. An apparatus for inspecting a pattern, comprising:
an imaging unit which captures optical images of corresponding areas of two patterns which are originally formed so as to have an identical shape on a substrate and obtaining a reference image and an inspection image; and
an image processing unit which processes the reference image and the inspection image to detect a defect in the inspection image, the first brightness difference being caused by the inspection apparatus;
wherein the image processing unit comprises:
- a positional difference corrector which corrects a positional difference between the reference image and the inspection image;
- a first brightness difference corrector which corrects a first brightness difference of a corresponding small area between the positional difference corrected reference image and the inspection image, the first brightness difference corrector being specifically adapted to correct the first brightness difference which is caused by at least one of a difference in a sensitivity of each pixel of the image sensor, a difference in the amount of accumulated light due to unevenness of the speed of movement of the stage, and fluctuation in an illumination light;
- a second brightness difference corrector which corrects a second brightness difference of a corresponding large area between the first brightness difference corrected reference image and the inspection image, second brightness differences corrector being specifically adapted to correct the second brightness difference caused by the specimen, and a factor which causes said second brightness difference is a slight difference among patterns formed on the specimen; and
- a defect detector which detects a defect of the pattern formed on the specimen by using the second brightness difference corrected reference image and the inspection image.

8. The apparatus for inspecting a pattern according to claim 7, wherein the first brightness corrector corrects the first brightness difference which occurs as characteristics inherent in the apparatus for inspection.

9. The apparatus for inspecting a pattern according to claim 7, wherein said second brightness difference corrector detects second brightness differences occurring at random depending upon the pattern formed on the specimen.

* * * * *